(12) United States Patent
Visco et al.

(10) Patent No.: US 11,646,445 B2
(45) Date of Patent: *May 9, 2023

(54) STANDALONE SULFIDE BASED LITHIUM ION-CONDUCTING GLASS SOLID ELECTROLYTE AND ASSOCIATED STRUCTURES, CELLS AND METHODS

(71) Applicant: PolyPlus Battery Company, Berkeley, CA (US)

(72) Inventors: Steven J. Visco, Berkeley, CA (US); Yevgeniy S. Nimon, Danville, CA (US); Lutgard C. De Jonghe, Lafayette, CA (US); Bruce D. Katz, Moraga, CA (US); Vitaliy Nimon, San Francisco, CA (US)

(73) Assignee: PolyPlus Battery Company, Berkeley, CA (US)

( * ) Notice: Subject to any disclaimer, the term of this patent is extended or adjusted under 35 U.S.C. 154(b) by 319 days.

This patent is subject to a terminal disclaimer.

(21) Appl. No.: 16/948,836

(22) Filed: Oct. 1, 2020

(65) Prior Publication Data

US 2021/0098819 A1 Apr. 1, 2021

Related U.S. Application Data

(63) Continuation of application No. 16/161,720, filed on Oct. 16, 2018, now Pat. No. 10,833,361, which is a
(Continued)

(51) Int. Cl.
*H01M 10/0562* (2010.01)
*H01M 10/0525* (2010.01)
(Continued)

(52) U.S. Cl.
CPC ........ *H01M 10/0562* (2013.01); *C03B 17/06* (2013.01); *C03B 17/064* (2013.01);
(Continued)

(58) Field of Classification Search
None
See application file for complete search history.

(56) References Cited

U.S. PATENT DOCUMENTS

| 4,042,482 A | 8/1977 | Shannon et al. |
| 4,208,474 A | 6/1980 | Jacobson et al. |

(Continued)

FOREIGN PATENT DOCUMENTS

| BR | 112017011548 A2 | 7/2018 |
| BR | 112017011768 A2 | 7/2018 |

(Continued)

OTHER PUBLICATIONS

Restriction Requirement for U.S. Appl. No. 15/380,989, dated Jul. 5, 2018.
(Continued)

*Primary Examiner* — Carlos Barcena
(74) *Attorney, Agent, or Firm* — Weaver Austin Villeneuve & Sampson LLP

(57) ABSTRACT

A standalone lithium ion-conductive solid electrolyte including a freestanding inorganic vitreous sheet of sulfide-based lithium ion conducting glass is capable of high performance in a lithium metal battery by providing a high degree of lithium ion conductivity while being highly resistant to the initiation and/or propagation of lithium dendrites. Such an electrolyte is also itself manufacturable, and readily adaptable for battery cell and cell component manufacture, in a cost-effective, scalable manner.

18 Claims, 20 Drawing Sheets

Related U.S. Application Data continuation of application No. 14/954,816, filed on Nov. 30, 2015, now Pat. No. 10,147,968.

(60) Provisional application No. 62/222,408, filed on Sep. 23, 2015, provisional application No. 62/196,247, filed on Jul. 23, 2015, provisional application No. 62/171,561, filed on Jun. 5, 2015, provisional application No. 62/165,791, filed on May 22, 2015, provisional application No. 62/149,250, filed on Apr. 17, 2015, provisional application No. 62/146,809, filed on Apr. 13, 2015, provisional application No. 62/111,048, filed on Feb. 2, 2015, provisional application No. 62/086,641, filed on Dec. 2, 2014.

(51) Int. Cl.

| | | |
|---|---|---|
| *C03B 23/037* | (2006.01) | |
| *C03B 17/06* | (2006.01) | |
| *C03B 33/023* | (2006.01) | |
| *C03B 23/24* | (2006.01) | |
| *C03C 3/19* | (2006.01) | |
| *C03C 3/32* | (2006.01) | |
| *C03C 4/18* | (2006.01) | |

(52) U.S. Cl.
CPC .......... *C03B 17/067* (2013.01); *C03B 23/037* (2013.01); *C03B 23/245* (2013.01); *C03B 33/0235* (2013.01); *C03C 3/19* (2013.01); *C03C 3/321* (2013.01); *C03C 4/18* (2013.01); *H01M 10/0525* (2013.01); *H01M 2300/0068* (2013.01)

(56) References Cited

U.S. PATENT DOCUMENTS

| | | | |
|---|---|---|---|
| 4,331,750 A | 5/1982 | Malugani et al. | |
| 4,444,857 A | 4/1984 | Duchange et al. | |
| 4,465,745 A | 8/1984 | Akridge | |
| 4,465,746 A | 8/1984 | Akridge | |
| 4,477,545 A | 10/1984 | Akridge et al. | |
| 4,478,920 A | 10/1984 | Gabano et al. | |
| 4,513,070 A | 4/1985 | Carette et al. | |
| 4,585,714 A | 4/1986 | Akridge et al. | |
| 4,599,284 A | 7/1986 | Adridge | |
| 4,985,317 A | 1/1991 | Adachi et al. | |
| 5,314,765 A | 5/1994 | Bates | |
| 5,338,625 A | 8/1994 | Bates et al. | |
| 5,455,126 A | 10/1995 | Bates et al. | |
| 5,512,147 A | 4/1996 | Bates et al. | |
| 5,567,210 A | 10/1996 | Bates et al. | |
| 5,569,520 A | 10/1996 | Bates | |
| 5,597,660 A | 1/1997 | Bates et al. | |
| 5,612,152 A | 3/1997 | Bates | |
| 5,648,187 A | 7/1997 | Skotheim | |
| 5,702,995 A | 12/1997 | Fu | |
| 5,958,281 A | 9/1999 | Takada et al. | |
| 5,961,672 A | 10/1999 | Skotheim et al. | |
| 6,030,909 A | 2/2000 | Fu | |
| 6,214,061 B1 | 4/2001 | Visco et al. | |
| 6,315,881 B1 | 11/2001 | Fu | |
| 6,402,795 B1 | 6/2002 | Chu et al. | |
| 6,413,285 B1 | 7/2002 | Chu et al. | |
| 6,432,584 B1 | 8/2002 | Visco et al. | |
| 6,485,622 B1 | 11/2002 | Fu | |
| 6,723,140 B2 | 4/2004 | Chu et al. | |
| 6,733,924 B1 | 5/2004 | Skotheim et al. | |
| 6,797,428 B1 | 9/2004 | Skotheim et al. | |
| 7,211,532 B2 | 5/2007 | Fu | |
| 7,247,408 B2 | 7/2007 | Skotheim | |
| 7,273,682 B2 | 9/2007 | Park et al. | |
| 7,282,295 B2 | 10/2007 | Visco et al. | |
| 7,282,296 B2 | 10/2007 | Visco et al. | |
| 7,282,302 B2 | 10/2007 | Visco et al. | |
| 7,390,591 B2 | 6/2008 | Visco et al. | |
| 7,645,543 B2 | 1/2010 | Visco et al. | |
| 7,666,233 B2 | 2/2010 | Visco et al. | |
| 7,824,806 B2 | 11/2010 | Visco et al. | |
| 7,829,212 B2 | 11/2010 | Visco et al. | |
| 7,838,144 B2 | 11/2010 | Visco et al. | |
| 7,858,223 B2 | 12/2010 | Visco et al. | |
| 8,012,631 B2 | 9/2011 | Seino et al. | |
| 8,048,570 B2 | 11/2011 | Visco et al. | |
| 8,048,571 B2 | 11/2011 | Visco et al. | |
| 8,092,941 B2 | 1/2012 | Weppner et al. | |
| 8,114,171 B2 | 2/2012 | Visco et al. | |
| 8,129,052 B2 | 3/2012 | Visco et al. | |
| 8,182,943 B2 | 5/2012 | Visco et al. | |
| 8,202,649 B2 | 6/2012 | Visco et al. | |
| 8,293,398 B2 | 10/2012 | Visco et al. | |
| 8,304,019 B1 | 11/2012 | Pichler | |
| 8,323,820 B2 | 12/2012 | Visco et al. | |
| 8,334,075 B2 | 12/2012 | Visco et al. | |
| 8,389,147 B2 | 3/2013 | Visco et al. | |
| 8,404,388 B2 | 3/2013 | Visco et al. | |
| 8,445,136 B2 | 5/2013 | Visco et al. | |
| 8,455,131 B2 | 6/2013 | Visco et al. | |
| 8,501,339 B2 | 8/2013 | Visco et al. | |
| 8,556,197 B2 | 10/2013 | Hama et al. | |
| 8,652,686 B2 | 2/2014 | Visco et al. | |
| 8,658,304 B2 | 2/2014 | Visco et al. | |
| 8,658,317 B2 | 2/2014 | Weppner et al. | |
| 8,673,477 B2 | 3/2014 | Visco et al. | |
| 8,691,444 B2 | 4/2014 | Visco et al. | |
| 8,691,928 B2 | 4/2014 | Hsieh et al. | |
| 8,778,522 B2 | 7/2014 | Visco et al. | |
| 8,778,543 B2 | 7/2014 | Shinohara et al. | |
| 8,828,573 B2 | 9/2014 | Visco et al. | |
| 8,828,574 B2 | 9/2014 | Visco et al. | |
| 8,828,575 B2 | 9/2014 | Visco et al. | |
| 8,828,580 B2 | 9/2014 | Visco et al. | |
| 9,123,941 B2 | 9/2015 | Visco et al. | |
| 9,130,198 B2 | 9/2015 | Visco et al. | |
| 9,136,568 B2 | 9/2015 | Visco et al. | |
| 9,287,573 B2 | 3/2016 | Visco et al. | |
| 9,362,538 B2 | 6/2016 | Visco et al. | |
| 9,598,769 B2 | 3/2017 | Elam et al. | |
| 9,601,779 B2 | 3/2017 | Visco et al. | |
| 9,660,265 B2 | 5/2017 | Visco et al. | |
| 9,905,860 B2 | 2/2018 | Visco et al. | |
| 10,147,968 B2 | 12/2018 | Visco et al. | |
| 10,164,289 B2 | 12/2018 | Visco et al. | |
| 10,601,071 B2 | 3/2020 | Visco et al. | |
| 10,629,950 B2 | 4/2020 | Visco et al. | |
| 10,707,536 B2 | 7/2020 | Visco et al. | |
| 10,833,361 B2 | 11/2020 | Visco et al. | |
| 10,840,546 B2 | 11/2020 | Visco et al. | |
| 10,840,547 B2 | 11/2020 | Visco et al. | |
| 10,862,171 B2 | 12/2020 | Visco et al. | |
| 10,868,293 B2 | 12/2020 | Visco et al. | |
| 10,916,753 B2 | 2/2021 | Visco et al. | |
| 11,171,364 B2 | 11/2021 | Visco et al. | |
| 11,239,495 B2 | 2/2022 | Visco et al. | |
| 11,444,270 B2 | 9/2022 | Visco et al. | |
| 2002/0012846 A1 | 1/2002 | Skotheim et al. | |
| 2002/0036131 A1 | 3/2002 | Kugai et al. | |
| 2004/0005504 A1 | 1/2004 | Kugai et al. | |
| 2005/0107239 A1 | 5/2005 | Akiba et al. | |
| 2006/0222954 A1 | 10/2006 | Skotheim et al. | |
| 2007/0037058 A1 | 2/2007 | Visco et al. | |
| 2007/0087269 A1 | 4/2007 | Inda | |
| 2007/0148533 A1 | 6/2007 | Anglin et al. | |
| 2007/0160911 A1 | 7/2007 | Senga et al. | |
| 2007/0231704 A1 | 10/2007 | Inda | |
| 2007/0248888 A1 | 10/2007 | Seino et al. | |
| 2007/0271957 A1 | 11/2007 | Nakamura et al. | |
| 2007/0281089 A1 | 12/2007 | Heller et al. | |
| 2007/0295385 A1 | 12/2007 | Sheats et al. | |
| 2008/0057386 A1 | 3/2008 | Visco et al. | |
| 2008/0057387 A1 | 3/2008 | Visco et al. | |
| 2008/0057399 A1 | 3/2008 | Visco et al. | |
| 2008/0113261 A1 | 5/2008 | De Jongye et al. | |

(56) References Cited

U.S. PATENT DOCUMENTS

| | | |
|---|---|---|
| 2008/0318132 A1 | 12/2008 | Visco et al. |
| 2009/0100874 A1 | 4/2009 | Tateishi et al. |
| 2009/0142669 A1 | 6/2009 | Shinohara et al. |
| 2009/0159839 A1 | 6/2009 | Seino et al. |
| 2009/0297935 A1 | 12/2009 | Visco et al. |
| 2010/0040952 A1 | 2/2010 | Kimura et al. |
| 2010/0075209 A1 | 3/2010 | Kimura et al. |
| 2010/0190063 A1 | 7/2010 | Fukumoto et al. |
| 2011/0065007 A1 | 3/2011 | Kamya et al. |
| 2011/0076570 A1 | 3/2011 | Hama et al. |
| 2011/0108642 A1 | 5/2011 | Hama et al. |
| 2011/0117726 A1 | 5/2011 | Pinnington et al. |
| 2012/0034529 A1 | 2/2012 | Tatsumisago et al. |
| 2012/0094188 A1 | 4/2012 | Visco et al. |
| 2012/0177997 A1 | 7/2012 | Nakamoto et al. |
| 2012/0183834 A1 | 7/2012 | Kanda et al. |
| 2012/0183880 A1 | 7/2012 | Toussaint et al. |
| 2012/0189918 A1 | 7/2012 | Tatsumisago et al. |
| 2013/0122365 A1 | 5/2013 | Hydro-Quebec |
| 2013/0164631 A1 | 6/2013 | Ohtomo et al. |
| 2013/0164632 A1 | 6/2013 | Kato et al. |
| 2013/0288134 A1 | 10/2013 | Hama et al. |
| 2014/0072875 A1 | 3/2014 | Uchiyama |
| 2014/0093785 A1 | 4/2014 | Sugiura et al. |
| 2014/0141341 A1 | 5/2014 | Ohtomo et al. |
| 2014/0151371 A1 | 6/2014 | Chang et al. |
| 2014/0154586 A1 | 6/2014 | Hayashi et al. |
| 2014/0162108 A1 | 6/2014 | Visco et al. |
| 2014/0170465 A1 | 6/2014 | Visco et al. |
| 2014/0322584 A1 | 10/2014 | Visco et al. |
| 2015/0068251 A1 | 3/2015 | Ottermann et al. |
| 2015/0107510 A1 | 4/2015 | Lindfors |
| 2015/0214555 A1 | 7/2015 | Visco et al. |
| 2015/0340720 A1 | 11/2015 | Visco et al. |
| 2015/0349371 A1 | 12/2015 | Neudecker et al. |
| 2016/0028053 A1 | 1/2016 | Visco et al. |
| 2016/0028063 A1 | 1/2016 | Visco et al. |
| 2016/0072153 A1 | 3/2016 | Ichikawa et al. |
| 2016/0087263 A1 | 3/2016 | Gadkaree et al. |
| 2016/0133989 A1 | 5/2016 | Suzuki et al. |
| 2016/0156065 A1 | 6/2016 | Visco et al. |
| 2016/0190640 A1 | 6/2016 | Visco et al. |
| 2016/0197326 A1 | 7/2016 | Visco et al. |
| 2016/0261002 A1 | 9/2016 | Trevey et al. |
| 2016/0351878 A1 | 12/2016 | Visco et al. |
| 2016/0351879 A1 | 12/2016 | Visco et al. |
| 2017/0229731 A1 | 8/2017 | Visco et al. |
| 2017/0288228 A1 | 10/2017 | Ito et al. |
| 2017/0331156 A1 | 11/2017 | Visco et al. |
| 2017/0365853 A1 | 12/2017 | Visco et al. |
| 2018/0131040 A1 | 5/2018 | Visco et al. |
| 2019/0013546 A1 | 1/2019 | Visco et al. |
| 2019/0148768 A1 | 5/2019 | Visco et al. |
| 2019/0173128 A1 | 6/2019 | Visco et al. |
| 2019/0181496 A1 | 6/2019 | Visco et al. |
| 2019/0229370 A1 | 7/2019 | Visco et al. |
| 2019/0237810 A1 | 8/2019 | Visco et al. |
| 2019/0305370 A1 | 10/2019 | Minamida |
| 2020/0014063 A1 | 1/2020 | Visco et al. |
| 2020/0028209 A1 | 1/2020 | Visco et al. |
| 2020/0127275 A1 | 4/2020 | Visco et al. |
| 2020/0243902 A1 | 7/2020 | Visco et al. |
| 2020/0251773 A1 | 8/2020 | Visco et al. |
| 2020/0259212 A1 | 8/2020 | Visco et al. |
| 2020/0395633 A1 | 12/2020 | Visco et al. |
| 2021/0098818 A1 | 4/2021 | Visco et al. |
| 2021/0111427 A1 | 4/2021 | Visco et al. |
| 2021/0126236 A1 | 4/2021 | Visco et al. |
| 2021/0218005 A1 | 7/2021 | Matzner et al. |
| 2021/0218055 A1 | 7/2021 | Visco et al. |
| 2021/0320328 A1 | 10/2021 | Visco et al. |
| 2021/0340048 A1 | 11/2021 | Visco et al. |
| 2021/0380456 A1 | 12/2021 | Visco et al. |
| 2021/0395128 A1 | 12/2021 | Visco et al. |
| 2022/0013857 A1 | 1/2022 | Visco et al. |
| 2022/0045328 A1 | 2/2022 | Visco et al. |
| 2022/0045352 A1 | 2/2022 | Visco et al. |
| 2022/0045353 A1 | 2/2022 | Visco et al. |
| 2022/0216509 A1 | 7/2022 | Sasaki et al. |
| 2022/0263137 A1 | 8/2022 | Visco et al. |
| 2022/0302492 A1 | 9/2022 | Visco et al. |
| 2022/0320573 A1 | 10/2022 | Visco et al. |
| 2022/0320579 A1 | 10/2022 | Visco et al. |
| 2022/0328865 A1 | 10/2022 | Visco et al. |
| 2022/0328866 A1 | 10/2022 | Visco et al. |
| 2022/0336849 A1 | 10/2022 | Visco et al. |
| 2022/0396516 A1 | 12/2022 | Visco et al. |
| 2022/0399567 A1 | 12/2022 | Visco et al. |

FOREIGN PATENT DOCUMENTS

| | | |
|---|---|---|
| CN | 101494299 A | 7/2009 |
| EP | 0774654 B1 | 1/2000 |
| EP | 3 227 952 | 10/2017 |
| JP | 2004-063419 A | 2/2004 |
| JP | 2004127743 A | 4/2004 |
| JP | 2007311084 A | 11/2007 |
| JP | 2008-103229 A | 5/2008 |
| JP | 2008103258 A | 5/2008 |
| JP | 2008-300300 A | 12/2008 |
| JP | 2009-158476 A | 7/2009 |
| JP | 2009252670 A | 10/2009 |
| JP | 2010-108881 | 5/2010 |
| JP | 2012-043654 | 3/2012 |
| JP | 2012-043654 A | 3/2012 |
| JP | 2012-089424 | 5/2012 |
| JP | 2012-096973 A | 5/2012 |
| JP | 2012089244 A | 5/2012 |
| JP | 2013-117398 A | 1/2013 |
| JP | 2013-232335 | 11/2013 |
| JP | 2014-035989 A | 2/2014 |
| JP | 2014-096311 | 5/2014 |
| JP | 2014127272 A | 7/2014 |
| JP | 2014-221714 | 11/2014 |
| WO | WO-2009003695 A2 | 1/2009 |
| WO | WO-2012017544 A1 | 2/2012 |
| WO | 2016/089897 A1 | 6/2016 |
| WO | 2016/089899 A1 | 6/2016 |
| WO | 2017/112550 A1 | 6/2017 |
| WO | 2017/197039 A1 | 11/2017 |
| WO | WO-2018141919 A1 | 8/2018 |
| WO | 2019/010047 A1 | 1/2019 |
| WO | WO-2019018386 A1 | 1/2019 |

OTHER PUBLICATIONS

Non-Final Office Action for U.S. Appl. No. 14/954,812, dated Aug. 1, 2018.

Non-Final Office Action for U.S. Appl. No. 14/954,816, dated Aug. 1, 2018.

Notice of Allowance for U.S. Appl. No. 14/954,816, dated Oct. 15, 2018.

Notice of Allowance for U.S. Appl. No. 14/954,812, dated Oct. 30, 2018.

Non-final Office Actions for U.S. Appl. No. 15/380,989, dated Mar. 26, 2019.

Restriction Requirement for U.S. Appl. No. 15/726,302, dated May 6, 2019.

Restriction Requirement for U.S. Appl. No. 15/592,102, dated Mar. 7, 2019.

Non-final Office Action for U.S. Appl. No. 15/592,102, dated Aug. 8, 2019.

Restriction Requirement for U.S. Appl. No. 15/726,302, dated Nov. 19, 2019.

Notice of Allowance for U.S. Appl. No. 16/012,588, dated Dec. 3, 2019.

Notice of Allowance for U.S. Appl. No. 15/380,989, dated Dec. 6, 2019.

Final Office Action for U.S. Appl. No. 15/592,102, dated Jan. 27, 2020.

(56) References Cited

OTHER PUBLICATIONS

Notice of Allowance for U.S. Appl. No. 15/592,102, dated Mar. 6, 2020.
Non-final Office Action for U.S. Appl. No. 15/726,302, dated Apr. 16, 2020.
Non-final Office Action for U.S. Appl. No. 16/179,803, dated Apr. 28, 2020.
Restriction Requirement for U.S. Appl. No. 16/174,058, dated Apr. 16, 2020.
Notice of Allowance for U.S. Appl. No. 16/179,803, dated Aug. 11, 2020.
Notice of Allowance for U.S. Appl. No. 16/341,872, dated Aug. 21, 2020.
Notice of Allowance for U.S. Appl. No. 16/341,874, dated Sep. 3, 2020.
Notice of Allowance for U.S. Appl. No. 16/663,177, dated Sep. 3, 2020.
WO patent application No. PCT/US2015/063234, International Search Report and Written Opinion dated Apr. 1, 2016.
WO patent application No. PCT/US2015/063231, International Search Report and Written Opinion dated Mar. 11, 2016.
WO patent application No. PCT/US2016/067338, International Search Report and Written Opinion dated May 19, 2017.
WO patent application No. PCT/US2017/032024, International Search Report and Written Opinion, dated Aug. 21, 2017.
First Office Action, dated Aug. 15, 2017, for Mexican Application No. MX/a/2017/007265. No Translation.
Extended European Search Report, dated May 22, 2018, for European Patent Application No. 15864779.2.
WO patent application No. PCT/US2015/063234, International Preliminary Report on Patentability, dated Jun. 15, 2017.
WO patent application No. PCT/US2015/063231, International Preliminary Report on Patentability, dated Jun. 15, 2017.
WO patent application No. PCT/US2016/067338, International Preliminary Report on Patentability, dated Jul. 5, 2017.
WO patent application No. PCT/US2018/039862, Invitation To Pay Additional Fees and, where applicable, Protest Fee, dated Aug. 28, 2018.
WO patent application No. PCT/US2018/042476, Invitation To Pay Additional Fees and, where applicable, Protest Fee, dated Sep. 12, 2018.
WO patent application No. PCT/US2018/039862, International Search Report and Written Opinion dated Oct. 19, 2018.
WO patent application No. PCT/US2018/042476, International Search Report and Written Opinion dated Nov. 9, 2018.
Communication Pursuant to Rules 161(2) and 162 EPC, (request for extra claims fees), dated Aug. 4, 2018, for European Patent Application No. 15864779.2.
Communication Pursuant to Rules 70(2) and 70a(2), dated Jun. 8, 2018, deadline for response to Extended European Search Report, for European Patent Application No. 15864779.2.
Communication Pursuant to Article 94(3) EPC, First Office Action, dated May 13, 2019, for European Patent Application No. 15864779.2.
Examination Report, dated Sep. 14, 2020, for European Patent Application No. 15864779.2, 3 Pages.
First Office Action, dated Feb. 3, 2019, for Chinese Patent Application No. 201580075233.0, with Chinese Search Report and English Translation.
Notice of Reasons for Rejection, dated May 24, 2019, for Japanese Patent Application No. 2017-529785, with machine translation.
Decision for Grant, dated Sep. 29, 2020, for Japanese Patent Application No. 2017-529785, without translation.
Second Office Action, dated Nov. 15, 2019, for Chinese Patent Application No. 201580075233.0, with English Translation.
Notice of Reasons for Rejection, dated Jan. 14, 2020, for Japanese Patent Application No. 2017-529785, with machine translation.
WO patent application No. PCT/US2018/039862, International Preliminary Report on Patentability, dated Jan. 7, 2020.
WO patent application No. PCT/US2018/042476, International Preliminary Report on Patentability, dated Jan. 21, 2020.
First Office Action, dated Jan. 14, 2020, for Brazilian Patent Application No. BR112017011768-1, with English Translation.
First Office Action, dated Jan. 14, 2020, for Brazilian Patent Application No. BR112017011548-1, with English Translation.
Notice of Allowance, dated Mar. 10, 2020, for Chinese Patent Application No. 201580075233.0, with English Translation.
Akridge, James R. et al., "Solid state batteries using vitreous solid electrolytes," Solid State Ionics 18 & 19 (1986) 1082-1087.
Bartholomew, Roger F. et al., "Electrical properties of new glasses based on the Li2S-SiS2 system," Journal of Non-Crystalline Solids 256&257 (1999) 242-247.
Bates, J.B. et al., "Thin-film rechargeable lithium batteries," 1995, Journal of Power Sources.
Bates, J.B. et al., "Electrical properties of amorphous lithium electrolyte thin films," 1992, Solid State Ionics.
Burckhardt, W. et al., "Fast Li+ ion transport in iodine-thioborate glasses," Mat. Res. Bull., vol. 19, pp. 1083-1089, 1984.
Cao, Can et al., "Recent advances in inorganic solid electrolytes for lithium batteries," Frontiers in Energy Research, Jun. 27, 2014, vol. 2, Article 25, pp. 1-10.
Fu, Jie, "Fast Li+ Ion Conduction in Li2O-Al2O3-TiO2-SiO2-P2O5 Glass-Ceramics," Journal of the American Ceramics Society, vol. 80, No. 7, Jul. 1997, pp. 1-5.
Fu, Jie, "Superionic conductivity of glass-ceramics in the system Li2O-Al2O3-TiO3-P2O5", Solid State Ionics 96 (1997), pp. 195-200.
Fu, Jie, "Fast Li+ ion conducting glass-ceramics in the system Li2O-Al2O3-GeO2-P2O5" Solid State Ionics 104 (1997), pp. 191-194.
Hayashi, Akitoshi et al., "Characterization of Li2S-P2S5 glass-ceramics as a solid electrolyte for lithium secondary batteries," Solid State Ionics 175 (2004) 683-686.
Hayashi, Akitoshi et al., "Formation of superionic crystals from mechanically milled Li2S-P2S5 glasses," Electrochemistry Communications 5 (2003) 111-114, Nov. 26, 2002.
Hayashi, Akitoshi et al., "Preparation and ionic conductivity of Li7P3S11-z glass-ceramic electrolytes," Journal of Non-Crystalline Solids 356 (2010) 2670-2673.
Hayashi, Akitoshi et al., "Preparation of Li2S-P2S5 amorphous solid electrolytes by mechanical milling," J. Am. Ceram. Soc., 84 [2] 477-79 (Feb. 28, 2001).
Hayashi, Akitoshi et al., "Mechanochemical synthesis of amorphous solid electrolytes using SiS2 and various lithium compounds," Solid State Ionics 175 (2004) 637-640, Dec. 9, 2003.
Jones, Steven D. et al., "A thin-film solid-state microbattery," Journal of Power Sources, 43-44 (1993) 505-513.
Kennedy, John H. et al., "Improved stability for the SiS2-P2S5-Li2S-LiI glass system," Solid State Ionics 28-30 (1998) 726-728.
Kennedy, J.H., "Ionically conductive glasses based on SiS2," Materials Chemistry and Physics, 23 (1989) 29-50.
Kennedy, John H. et al., "Ionically conductive sulfide-based lithium glasses," Journal of Non-Crystalline Solids 123 (1990) 328-338.
Kennedy, John H. et al., "Preparation and conductivity measurements of SiS2-Li2S glasses doped with LiBr and LiCl," Solid State Ionics 18 & 19 (1986) 368-371.
Kitaura, Hirokazu et al., "Fabrication of electrode-electrolyte interfaces in all-solid-state rechargeable lithium batteries by using a supercooled liquid state of the glassy electrolytes," J. Mater. Chem., 2011, 21, 118.
Kondo, S. et al., "New lithium ion conductors based on Li2S-SiS2 system," Solid State Ionics 53-56 (1992) 1183-1186.
Malugani, J.P. et al., "Preparation and electrical properties of the 0,37 Li2S—0,18P2S5-0,45 LiI glass," Solid State Ionics 1 (1980) 519-523.
Mercier, René et al., "Superionic conduction in Li2S-P2S5-LiI—glasses," Solid State Ionics 5 (1981) 663-666.
Minami, Keiichi et al., "Electical and electrochemical properties of glass-ceramic electrolytes in the systems Li2S-P2S5-P2S3 and Li2S-P2S5-P2O5," Solid State Ionics 192 (2011) 122-125.

(56) References Cited

OTHER PUBLICATIONS

Minami, Keiichi et al., "Mechanochemical synthesis of Li2S-P2S5 glass electrolytes with lithium salts," Solid State Ionics 181 (2010) 1505-1509.

Minami, Keiichi et al., "Preparation and characterization of lithium ion conducting Li2S-P2S5-GeS2 glasses and glass-ceramics," Journal of Non-Crystalline Solids 356 (2010) 2666-2669.

Minami, Tsutomu et al., "Preparation and characterization of lithium ion-conducting oxysulfide glasses," Solid State Ionics 136-137 (2000) 1015-1023.

Mizuno, Fuminori et al., "Lithium ion conducting solid electrolytes prepared from Li2S, elemental P and S," Solid State Ionics 177 (2006) 2753-2757.

Ohtomo, Takamasa et al., "All-solid-state lithium secondary batteries using the 75Li2S-25P2S5glass and the 70Li2S-30P2S5 glass-ceramic as solid electrolytes," Journal of Power Sources 233 (2013) 231-235.

Ohtomo, Takamasa et al., "Electrical and electrochemical properties of Li2S-P2S5-P2-O5 glass-ceramic electrolytes," Journal of Power Sources 146 (2005) 715-718.

Ohtomo, Takamasa et al., "Mechanochemical synthesis of lithium ion conducting glasses and glass-ceramics in the system Li2S-P-S," Solid State Ionics 176 (2005) 2349-2353.

Pradel, Annie et al., "Electrical properties of lithium conductive silicon sulfide glasses prepared by twin roller quenching," Solid State Ionics 18 & 19 (1986) 351-355.

Rudolph, B. et al., "Cyclic voltammetry studies of the lithiumthioborate glass-indium interface," Electrochimica Acta, vol. 34, No. 11, pp. 1519-1521, 1989.

Sahami, Saeed et al., "Preparation and conductivity measurements of SiS2-Li2S-LiBr lithium ion conductive glasses," Journal of the Electrochemical Society,Apr. 1985, pp. 985-986.

Sakuda, Atsushi et al., "Sulfide solid electrolyte with favorable mechanical property for all-solid-state lithium battery," Scientific Reports 3:2261, Jul. 23, 2013.

Tatsumisago, Masahiro, "Glassy materials based on Li2S for all-solid-state lithium secondary batteries," Solid State Ionics 175 (2004) 13-18.

Tatsumisago, Masahiro et al., "Preparation and structure of lithium-ion-conducting mixed-anion glasses in the system LiBO2-LiBS2," J. Am. Ceram. Soc., 71 [9] 766-69 (1988).

Tatsumisago, Masahiro et al., "Recent development of sulfide solid electrolytes and interfacial modification for all-solid-state rechargeable lithium batteries," Journal of Asian Ceramic Societies 1 (2013) 17-25.

Trevey, James et al., "Glass-ceramic Li2S-P2S5 electrolytes prepared by a single step ball billing process and their appliction for all-solid-state lithium-ion batteries," Electrochemistry Communications 11 (2009) 1830-1833.

Visco, Steven J. et al., "Complex plane and 7Li NMR studies of highly conductive sulfide-based lithium glasses," Battery Testing, vol. 132, No. 4, pp. 751-753.

Visco, Steven J. et al., "Complex plane and 7Li NMR studies of arsenic sulfide-based lithium glasses," J. Electrochem. Soc.: Solid-State Science and Technology, Jul. 1985, pp. 1766-1770.

Yang, Min et al., "Membranes in lithium ion batteries," Membranes, (Jul. 4, 2012), 2, 367-383.

Bertschler, Eva-Maria et al., "Li+ Ion Conductors with Adamantane-Type Nitridophosphate Anions β-Li10P4N10 and Li13P4N10X3 with X=CI, Br", Chemistry: A European Journal, vol. 24, Issue 1, (Jan. 2, 2018), pp. 196-205.

BR Office Action dated Mar. 28, 2022 in Application No. BR20171111548.

BR Office Action dated Mar. 28, 2022 in Application No. BR20171111768 with English translation.

CA Office Action dated May 31, 2022, in Application No. CA2969113.

CA Office Action dated Oct. 7, 2021, in application No. CA2,969,117.

EP Search Report dated Dec. 22, 2021, in Application No. EP21183687.9.

Final Office Action for U.S. Appl. No. 15/726,302, dated Dec. 30, 2020.

Final Office Action for U.S. Appl. No. 15/929,959, dated Apr. 29, 2021.

First Office Action, dated Dec. 15, 2020, for Canadian Patent Application No. 2,969,113.

First Office Action, dated May 10, 2021, for Canadian Patent Application No. 2,969,117.

Geiss, M. "Sacrificial Interlayers for All-solid-state Batteries", Aug. 14, 2020, pp. 243.

George, S.M., "Atomic layer deposition: an overview", Chemical reviews, (Jan. 13, 2010), 110(1):111-31.

Hirota, Yukihiro and Osamu Mikami, "Energy Barrier Height Measurements of Chemically Vapour Deposited, P3N5 Films by Internal Photoinjection", Thin Solid Films, vol. 162, (Aug. 1988), pp. 41-47.

Hoffman, E. E., "Solubility of Nitrogen and Oxygen in Lithium and Methods of Lithium Purification," in Symposium on Newer Metals, ed. R. Jaffee (West Conshohocken, PA: ASTM International, 1960), 195-206. https://doi.org/10.1520/STP46339S.

Johnson, R.W., Hultqvist, A., Bent, S.F., "A brief review of atomic layer deposition: from fundamentals to applications", Materials today, (Jun. 1, 2014), 17(5):236-46.

JP Notice of Reasons for Rejection dated Oct. 5, 2021, in application No. JP20200181662 with English translation.

JP Office Action dated May 31, 2021, in Application No. JP2020-181662.

Kanno, R. and M. Murayama, "Lithium ionic conductor thio-LISICON:the Li2 S GeS2 P2 S 5 system", Journal of the electrochemical society, (Jun. 5, 2001), 148(7):A742.

KR Office Action dated Jun. 23, 2022 in Application No. KR10-2017-7018176 with English translation.

Levason, Bill and Andrew L. Hector (eds.), "Chemistry and Applications of Metal Nitrides," (Preface only), Coordinated Chemistry Reviews, vol. 257, Issues 13-14, (Jul. 2013), p. 1945.

Li, Xuemin et al., "Facile Synthesis of Lithium Sulfide Nanocrystals for Use in Advanced Rechargeable Batteries", ACS Appl. Mater. Interfaces, (Dec. 3, 2015), 7, 51, 28444-28451.

Maier-Komor, P., "Preparation of Phosphorus Targets Using the Compound Phosphorus Nitride", Nuclear Instruments and Methods in Physics Research Section A: Accelerators, Spectrometers, Detectors and Associated Equipment, vol. 257, Issue 1, (Jun. 1, 1987), pp. 1-3.

Mizuno, F., et al. "High lithium ion conducting glass-ceramics in the system Li2S-P2S5", Solid State Ionics, (Oct. 31, 2006), 177(26-32):2721-5.

Mizuno, Fuminori et al., "All Solid-state Lithium Secondary Batteries Using High Lithium Ion Conducting Li2S-P2S5 Glass-Ceramics", Chemistry Letters 2002, No. 12, The Chemical Society of Japan, (Dec. 5, 2002), 31(12):1244-1245 (with 2 cover pages).

Mizuno, Fuminori et al., "New, highly Ion-Conductive Crystals Precipitated from Li2S-P2S5 Glasses", Advanced Materials, (Apr. 4, 2005), 17(7):918-21.

Murayama, M., et al., "Material design of new lithium ionic conductor, thio-LISICON, in the Li2S-P2S5 system", Solid State Ionics, (May 31, 2004), 170(3-4):173-80.

Non-final Office Action for U.S. Appl. No. 15/726,302, dated Sep. 10, 2021.

Non-final Office Action for U.S. Appl. No. 16/161,720, dated Apr. 28, 2020.

Non-Final Office Action for U.S. Appl. No. 16/174,058, dated Sep. 17, 2021.

Notice of Allowance dated Oct. 1, 2021, in U.S. Appl. No. 16/781,713.

Notice of Allowance for U.S. Appl. No. 16/161,720, dated Aug. 6, 2020.

Notice of Allowance for U.S. Appl. No. 15/929,959, dated Aug. 4, 2021.

Notice of Allowance for U.S. Appl. No. 15/929,959, dated Jul. 12, 2021.

Notice of Intention to Grant, dated Jan. 26, 2021, for European Patent Application No. 15864779.2, 7 Pages.

(56) References Cited

OTHER PUBLICATIONS

Senevirathne, K. et al., "A New Crystalline LiPON Electrolyte: Synthesis, Properties, and Electronic Structure", Solid State Ionics, Feb. 21, 2013, vol. 233, pp. 95-101.

Stock, Alfred and Hans Grüneberg, "Über den Phosphorstickstoff", Berichte der deutschen chemischen Gesellschaft, vol. 40, Issue 2, (März-Mai 1907), pp. 2573-2578. No Translation.

Svensson PH, Kloo L. Synthesis, structure, and bonding in polyiodide and metal iodide-iodine systems. Chemical Reviews. (Mar. 22, 2003), 103(5):1649-84.

Tatsumisago, M., et al., "Superionic conduction in rapidly quenched Li2S-SiS2-Li3PO4 glasses", Journal of the Ceramic Society of Japan, (Nov. 1, 1993), 101(1179):1315-7.

Thangadurai, V. et al., "Novel fast lithium ion conduction in garnet-type $Li_5La_3M_2O_{12}$ (M=Nb, Ta)", Journal of the American Ceramic Society, Mar. 2003, vol. 86, No. 3, pp. 437-440.

U.S. Restriction Requirement dated Aug. 31, 2022 in U.S. Appl. No. 16/949,026.

U.S. Corrected Notice of Allowance dated Jun. 13, 2022, in U.S. Appl. No. 16/948,863.

U.S. Non-Final office Action dated Oct. 27, 2022 in U.S. Appl. No. 16/948,835.

U.S. Notice of Allowance dated May 12, 2022, in U.S. Appl. No. 16/948,863.

U.S. Notice of Allowance dated Oct. 20, 2021, in U.S. Appl. No. 16/781,713.

U.S. Appl. No. 16/948,864, inventors Visco et al., filed on Oct. 2, 2020.

U.S. Appl. No. 17/658,645, filed Apr. 8, 2022.

U.S. Appl. No. 17/658,646, filed Apr. 8, 2022.

U.S. Appl. No. 17/813,463, Inventors Visco et al., filed on Jul. 19, 2022.

U.S. Appl. No. 17/817,494, Inventors Visco et al., filed on Aug. 4, 2022.

U.S. Appl. No. 17/934,470, inventors Visco et al., filed on Sep. 22, 2022.

U.S. Appl. No. 18/048,400, inventors Visco et al., filed on Oct. 20, 2022.

U.S. Restriction Requirement dated Nov. 3, 2022 in U.S. Appl. No. 16/509,385.

Wada, H., et al., "Preparation and ionic conductivity of new B2S3-Li2S-LiI glasses", Materials research bulletin, (Feb. 1, 1983), 18(2):189-93.

Wenzel, Sebastian et al., "Interphase formation and degradation of charge transfer kinetics between a lithium metal anode and highly crystalline Li7P3S11 solid electrolyte", Solid State Ionics, (Mar. 1, 2016), 286:24-33.

Mexican Office Action dated Oct. 20, 2022 issued in Application No. MX/a/2017/007265 with English translation.

U.S. Non-Final Office Action dated Dec. 23, 2022 in U.S. Appl. No. 16/784,162.

U.S. Notice of allowance dated Dec. 9, 2022 in U.S. Appl. No. 17/248,225.

U.S. Restriction Requirement dated Dec. 23, 2022 in U.S. Appl. No. 16/556,736.

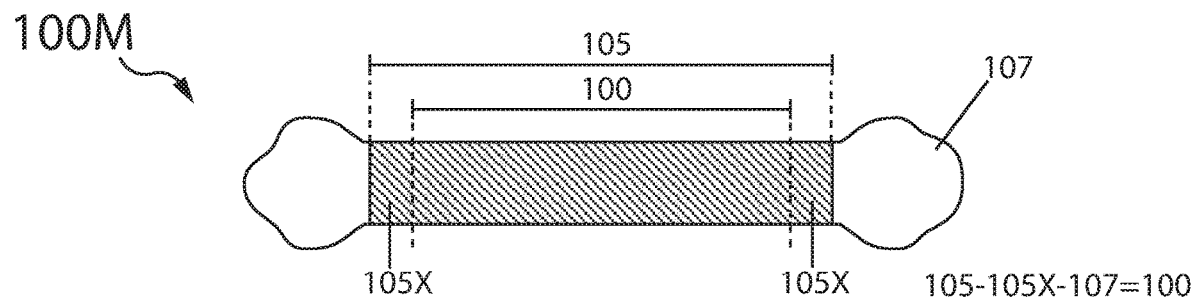
Figure 1E
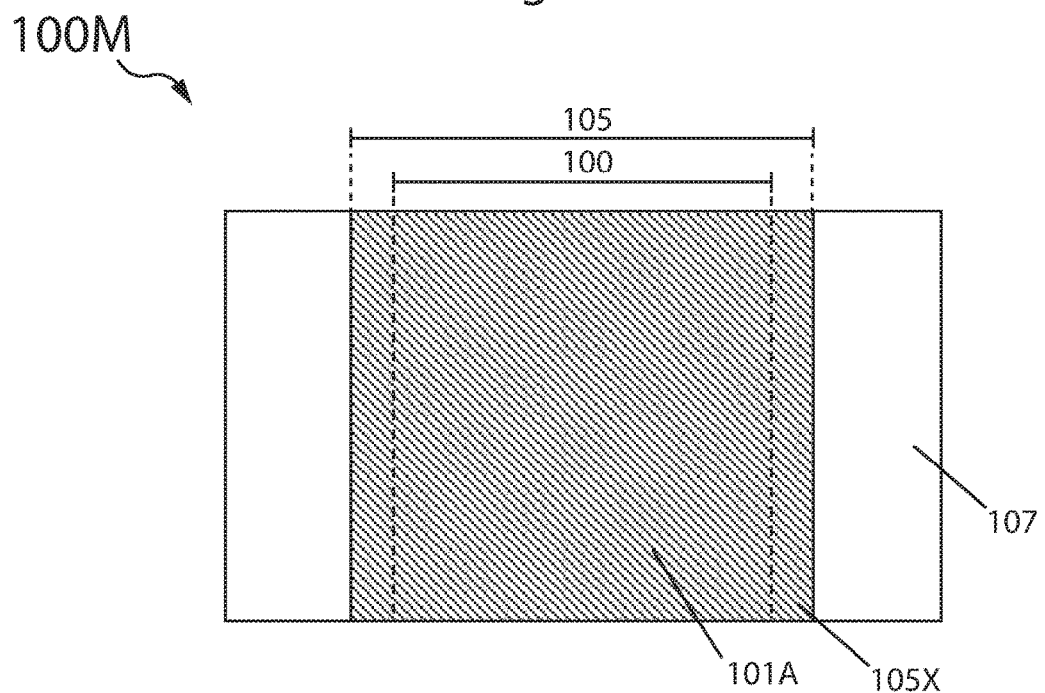
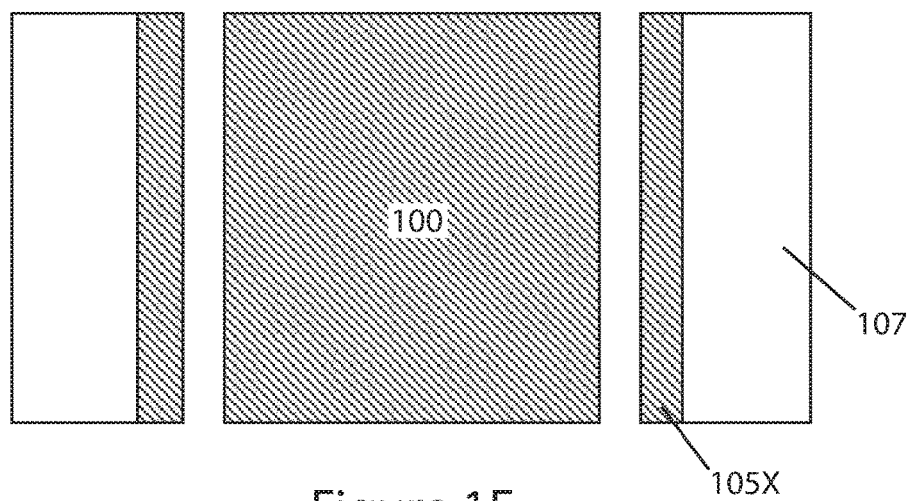
Figure 1F

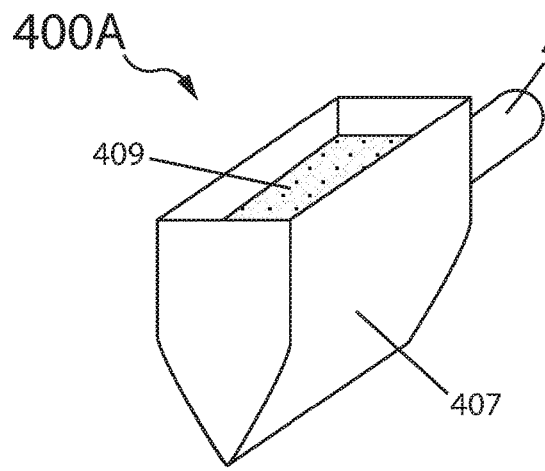 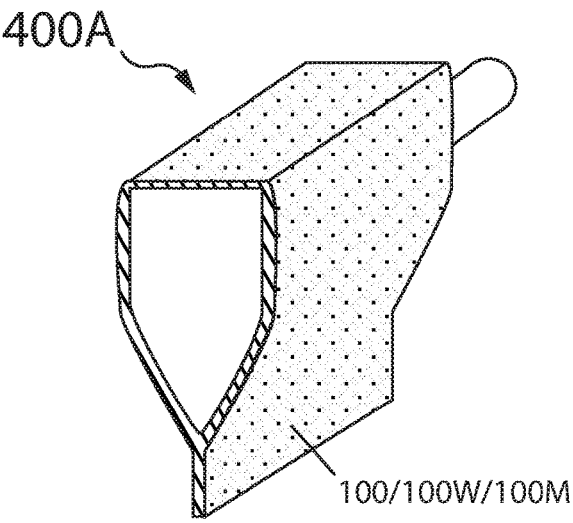
Figure 4A　　　　　Figure 4B
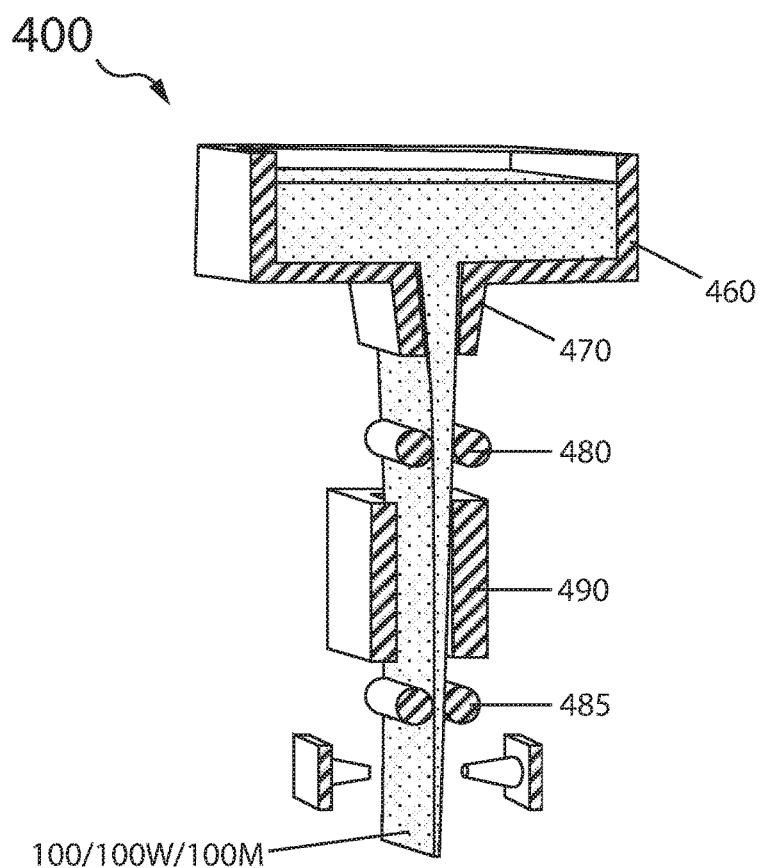
Figure 4C

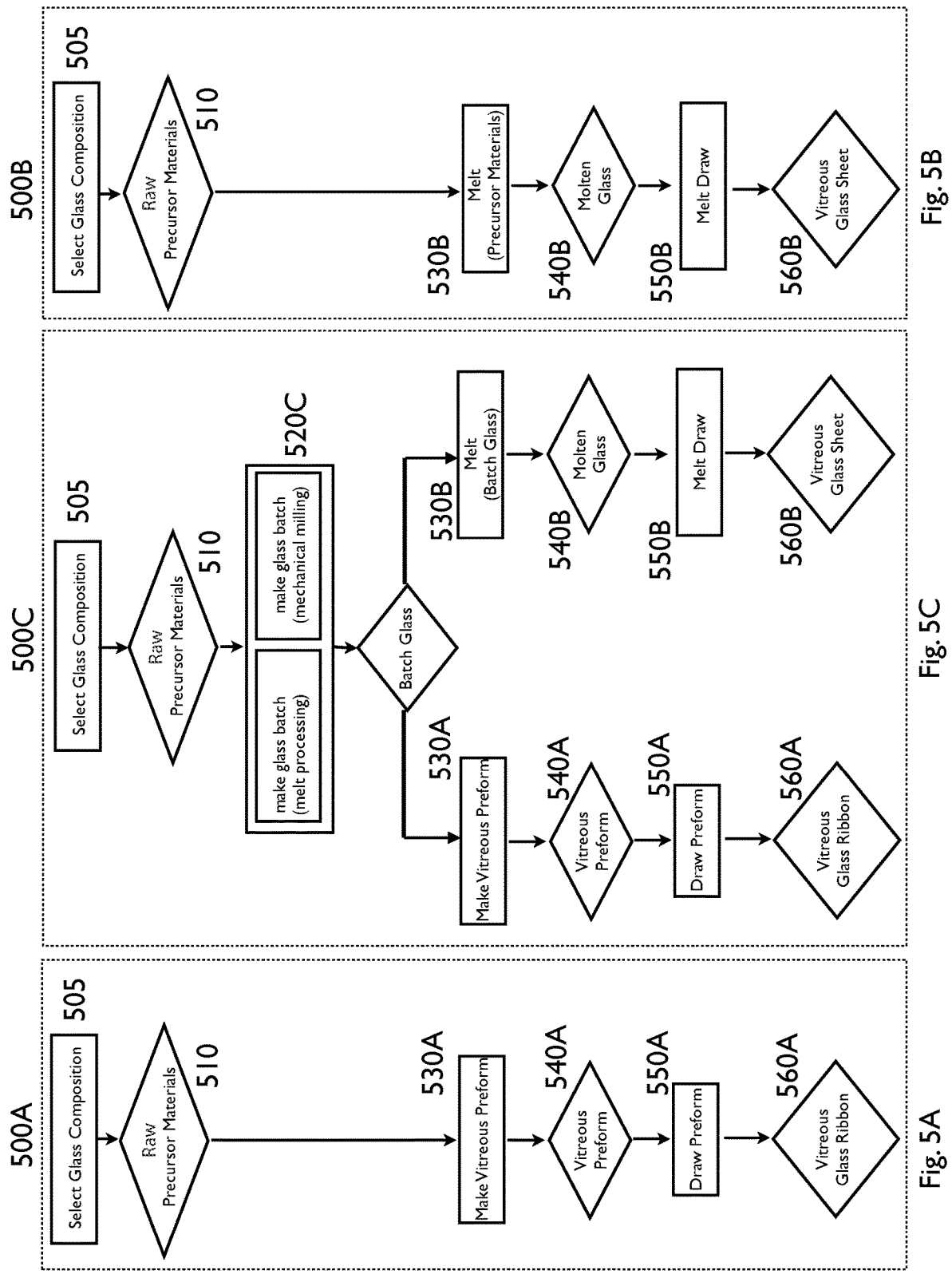

800F
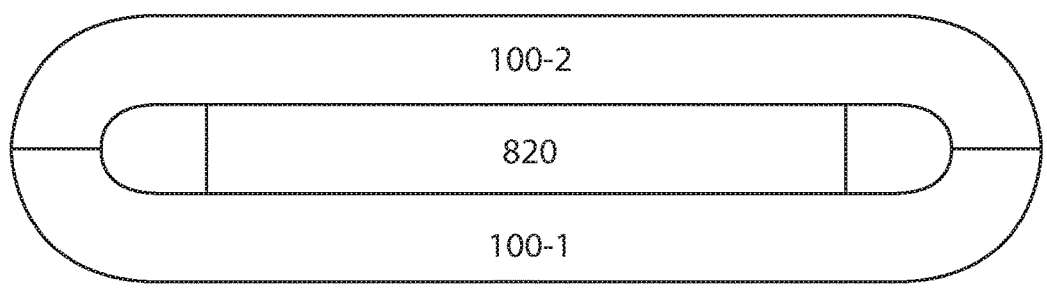
Figure 8F
800G
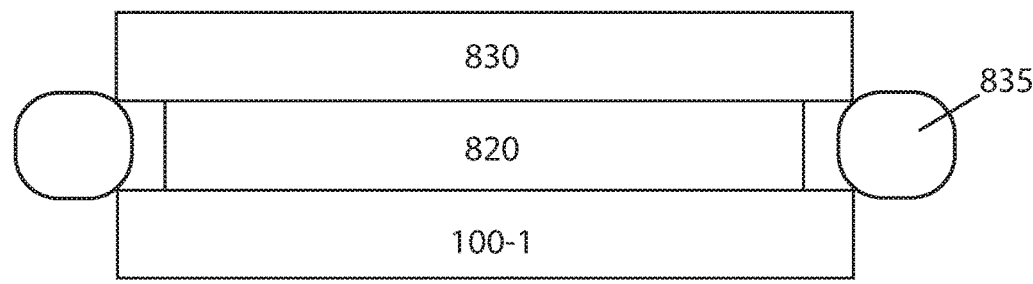
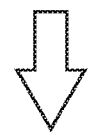 Sealed with heat
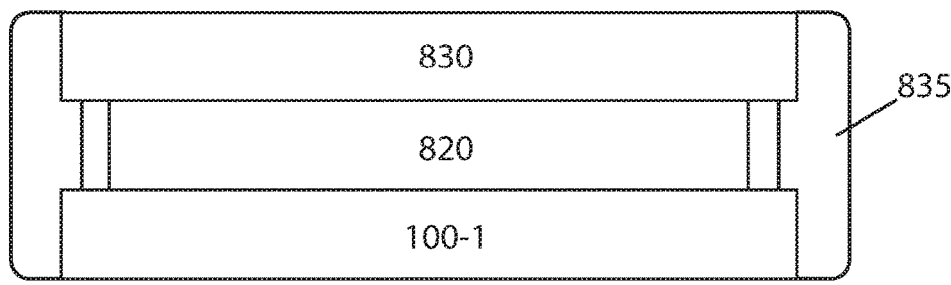
Figure 8G

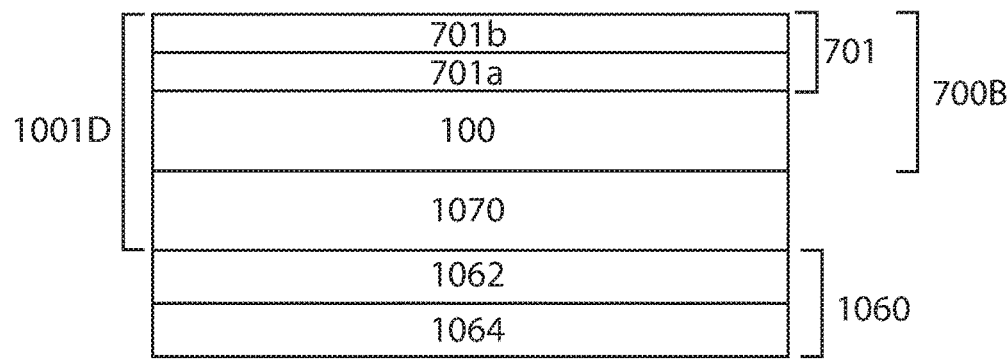
Initial Charge
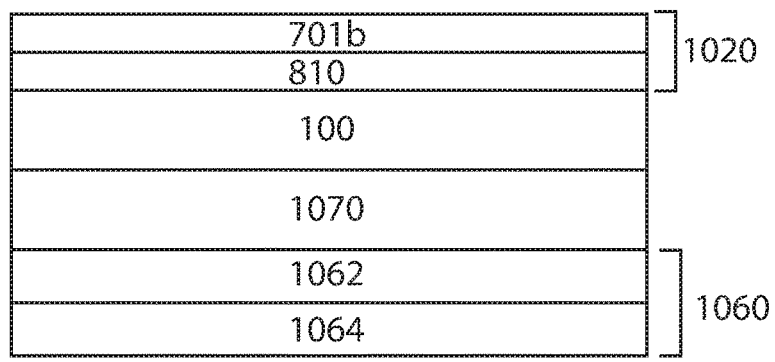
Figure 10D

STANDALONE SULFIDE BASED LITHIUM ION-CONDUCTING GLASS SOLID ELECTROLYTE AND ASSOCIATED STRUCTURES, CELLS AND METHODS

CROSS-REFERENCE TO RELATED APPLICATIONS

This application is a continuation of U.S. patent application Ser. No. 16/161,720, filed Oct. 16, 2018, titled STANDALONE SULFIDE BASED LITHIUM ION-CONDUCTING GLASS SOLID ELECTROLYTE AND ASSOCIATED STRUCTURES, CELLS AND METHODS, which is a continuation of U.S. patent application Ser. No. 14/954,816, filed Nov. 30, 2015, titled STANDALONE SULFIDE BASED LITHIUM ION-CONDUCTING GLASS SOLID ELECTROLYTE AND ASSOCIATED STRUCTURES, CELLS AND METHODS, which claims priority from U.S. Provisional Patent Application 62/086,641, filed Dec. 2, 2014, titled LITHIUM ION CONDUCTING GLASS LAYERS AND ASSOCIATED PROTECTED LITHIUM METAL ELECTRODES AND BATTERY CELLS; and from U.S. Provisional Patent Application 62/111,048, filed Feb. 2, 2015, titled LITHIUM ION CONDUCTING GLASS LAYERS AND ASSOCIATED PROTECTED LITHIUM METAL ELECTRODES AND BATTERY CELLS; and from U.S. Provisional Patent Application 62/146,809, filed Apr. 13, 2015, titled FREESTANDING LITHIUM ION CONDUCTING ARTICLES AND ASSOCIATED ELECTRODE ASSEMBLIES AND BATTERY CELLS, and from U.S. Provisional Patent Application 62/149,250, filed Apr. 17, 2015, titled FREESTANDING LITHIUM ION CONDUCTING ARTICLES AND ASSOCIATED ELECTRODE ASSEMBLIES AND BATTERY CELLS; and from U.S. Provisional Patent Application 62/165,791, filed May 22, 2015, titled LITHIUM ION CONDUCTING WALL STRUCTURES AND LITHIUM ELECTRODE ASSEMBLIES AND ASSOCIATED CONTINUOUS ROLLS AND LITHIUM BATTERY CELLS AND METHODS OF MAKING THEREOF; and from U.S. Provisional Patent Application 62/171,561, filed Jun. 5, 2015, titled STANDALONE INORGANIC SOLID ELECTROLYTE SHEETS, AND STANDALONE LITHIUM ION CONDUCTIVE SOLID ELECTROLYTE SEPARATORS, CONTINUOUS INORGANIC SEPARATOR ROLLS, LITHIUM ELECTRODE ASSEMBLIES, AND BATTERY CELLS THEREOF, AS WELL AS METHODS OF MAKING THEREOF; and from U.S. Provisional Patent Application 62/196,247, filed Jul. 23, 2015, titled STANDALONE INORGANIC SOLID ELECTROLYTE SHEETS, AND STANDALONE LITHIUM ION CONDUCTIVE SOLID ELECTROLYTE SEPARATORS, CONTINUOUS INORGANIC SEPARATOR ROLLS, LITHIUM ELECTRODE ASSEMBLIES, BATTERY CELLS THEREOF, AND METHODS OF MAKING; and from U.S. Provisional Patent Application 62/222,408, filed Sep. 23, 2015, titled VITREOUS SOLID ELECTROLYTE SHEETS OF Li ION CONDUCTING SULFUR BASED GLASS AND ASSOCIATED STRUCTURES, CELLS AND METHODS. Each of these applications is incorporated herein by reference in its entirety and for all purposes.

STATEMENT OF GOVERNMENT SUPPORT

This invention was made with Government support under Award No.: DE-AR0000349 and/or DE-AR0000772 awarded by the Advanced Research Projects Agency-Energy (ARPA-E), U.S. Department of Energy. The Government has certain rights in this invention.

FIELD OF THIS DISCLOSURE

This disclosure relates generally to the field of lithium electrochemical devices and components thereof, and in particular to lithium battery cells, lithium electrode assemblies, and Li ion-conducting solid electrolyte components (e.g., separators and solid electrolyte sheets) for use in lithium battery cells, as well as methods for making said components, electrode assemblies and battery cells.

BACKGROUND OF THIS DISCLOSURE

There is a continuing need for high performance battery cells and their associated cell components, and particularly for high energy density secondary batteries.

SUMMARY

Provided herein is a standalone lithium ion-conductive solid electrolyte, methods of making and using the electrolyte, and battery cells and cell components incorporating the electrolyte. An electrolyte in accordance with this disclosure is capable of high performance in a lithium metal battery by providing a high degree of lithium ion conductivity while being highly resistant to the initiation and/or propagation of lithium dendrites. In addition, such an electrolyte is also itself manufacturable, and readily adaptable for battery cell and cell component manufacture, in a cost-effective, scalable manner.

In one aspect, provided is a standalone lithium ion-conductive solid electrolyte including a freestanding inorganic vitreous sheet of sulfide-based lithium ion conducting glass. The glass has a liquid-like surface, an area of at least 10 cm$^2$, a thickness of no more than 100 µm, and a room temperature intrinsic lithium ion conductivity of at least 10$^{-5}$ S/cm. The liquid-like surface lacks flaws sufficient to initiate lithium dendrite penetration. For example, the liquid-like surface lacks surface flaws having a depth dimension greater than 1% of the sheet thickness, preferably less than 0.1% of the sheet thickness, and generally no more than 5 µm. Such a surface can be obtained through melt processing of a sulfide-based lithium ion conducting glass, such as by drawing molten glass or pulling/drawing a glass preform into a sheet. A sheet formed in this manner lacks powder particle, inter-particle boundaries, or contiguous void manifestations of a pressed powder compact extending between first and second principal surfaces that are sufficient to propagate a Li dendrite, and the liquid-like surface lacks flaw manifestations of a pressed powder compact that are sufficient to initiate Li dendrite penetration.

The electrolyte glass sheet can have physical dimensions and features suitable or particularly adapted for service as a separator in a battery cell. For example, the sheet can have a variety of areas such that it does not constrain battery cell format. It can have a substantially uniform thickness of no more than 100 µm, either as formed or as subsequently processed. And it can have substantially parallel lengthwise edges, again either as formed or as subsequently processed. The electrolyte glass sheet can also be configured as a flexible roll to facilitate storage and processing, for example a continuous web at least 100 cm in length.

In some embodiments, the sheet is characterized as an inorganic vitreous sulfide-based glass sheet. The vitreous sheet may be further characterized as having a threshold current for lithium dendrite initiation that is greater than 1 mA/cm$^2$.

Characterization of thermal, and associated viscosity, properties of a glass may be made with reference to the glass stability factor $\{T_x-T_g\}$, which is the separation of the onset of crystallization ($T_x$) and the glass transition temperature ($T_g$). Sulfur-based glass compositions that are less prone to crystallization and/or have higher melt viscosities, and therefore a higher glass stability factor, but still retain a requisite level of Li ion conductivity (>10$^{-5}$ S/cm) have been developed. While apparently counterintuitive to decrease the lithium ion conductivity of a glass that is specifically intended for use in a battery cell as a lithium ion conductor, in various embodiments this approach is contemplated for making and improving properties of the vitreous glass solid electrolyte sheets. Accordingly, in various embodiments the composition of a suitable sulfide-based glass system is adjusted to enhance thermal properties, even at the sacrifice of reduced conductivity, so that an electrolyte glass sheet as described and claimed may be obtained where the glass has a stability factor $\{T_x-T_g\}$<100° C.; or less than 50° C.; or even less than 30° C.

In some embodiments, the sulfide-based glass is of a type $Li_2S$—$YS_n$; $Li_2S$—$YS_n$—$YO_n$ and combinations thereof, wherein Y is selected from the group consisting of Ge, Si, As, B, or P, and n=2, 3/2 or 5/2, and the glass is chemically and electrochemically compatible in contact with lithium metal. Suitable glass may comprise $Li_2S$ and/or $Li_2O$ as a glass modifier and one or more of a glass former selected from the group consisting of $P_2S_5$, $P_2O_5$, $SiS_2$, $SiO_2$, $B_2S_3$ and $B_2O_3$. In some embodiments, the glass may be devoid of phosphorous.

In another aspect, a method of making a standalone lithium ion conductive solid electrolyte is provided. The method involves drawing a molten sheet of lithium ion conducting sulfide glass into a freestanding inorganic vitreous sheet of sulfide-based lithium ion conducting glass.

In still another aspect, another method of making a standalone lithium-ion conductive solid electrolyte is provided, the method involving providing a lithium ion conducting sulfide glass pre-form, and pulling on the preform at a temperature sufficient to draw the pre-form to a ribbon having a thickness in the range of 5 to 100 um.

In other aspects, the standalone sulfide based lithium ion-conductive glass solid electrolyte may be disposed in a battery cell component as a separator adjacent a negative lithium electroactive layer, or in a battery cell as a separator between a positive electrode and a negative lithium electroactive layer.

This and other aspects are described in further detail below.

BRIEF DESCRIPTION OF THE DRAWINGS

FIGS. 1E-F illustrate a freestanding Li ion conducting solid electrolyte sheet of this disclosure and a mother-sheet from which it is cut-to-size.

FIGS. 4A-D illustrate apparatus for making a freestanding Li ion conducting solid electrolyte sheet in accordance with various embodiments of this disclosure: FIGS. 4A-B illustrate a fusion draw apparatus; FIG. 4C illustrates a slot draw apparatus; and FIG. 4D illustrates a preform draw apparatus.

FIGS. 5A-C illustrate flowcharts for methods of making a continuous freestanding Li ion conducting solid electrolyte inorganic vitreous glass sheet of this disclosure.

FIGS. 8C-G illustrate cross sectional depictions of lithium metal electrode assemblies, in accordance with various embodiments of this disclosure.

FIGS. 10A-E illustrate battery cells in accordance with various embodiments of this disclosure. In various embodiments the battery cell is a solid-state cell; a cell having a common liquid electrolyte; a hybrid cell having lithium metal electrode assembly of this disclosure; a constructed with a lithium metal free laminate; and a hybrid cell having a positive electrode assembly of this disclosure.

DETAILED DESCRIPTION

Figure 1A:
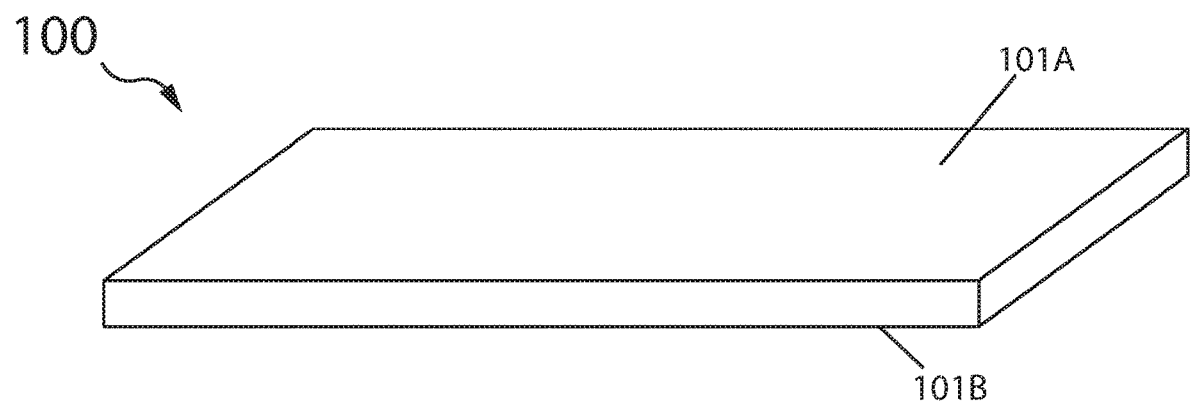
FIGS. 1A-D illustrate a freestanding Li ion conducting solid electrolyte sheet of this disclosure.
Figure 1B:
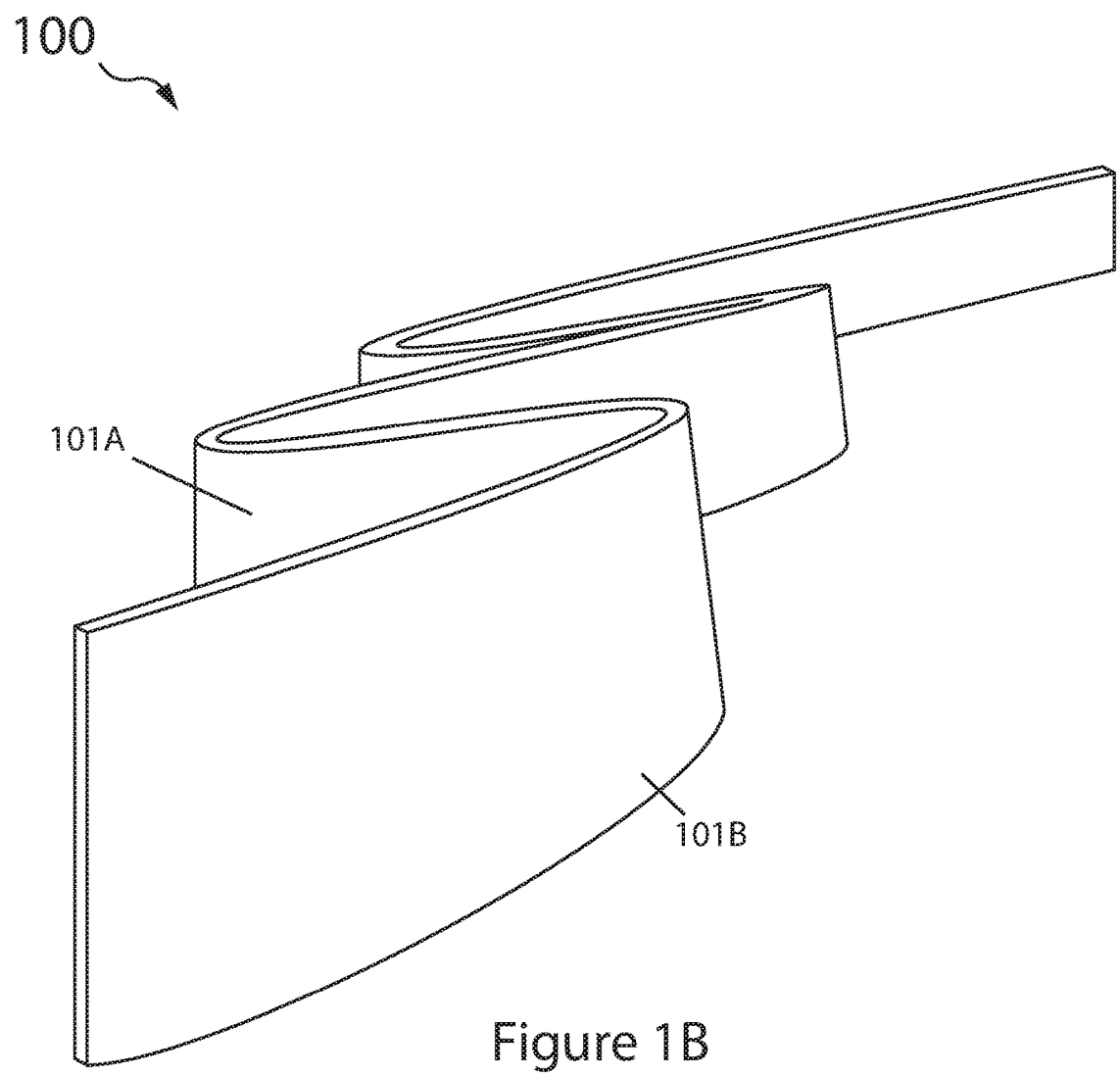
Figure 1C:
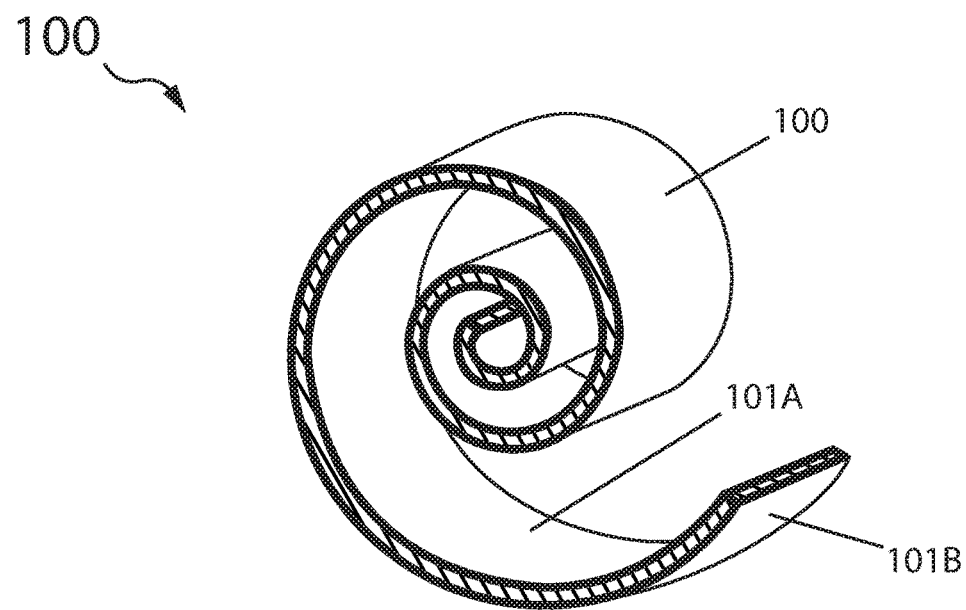
Figure 1D:
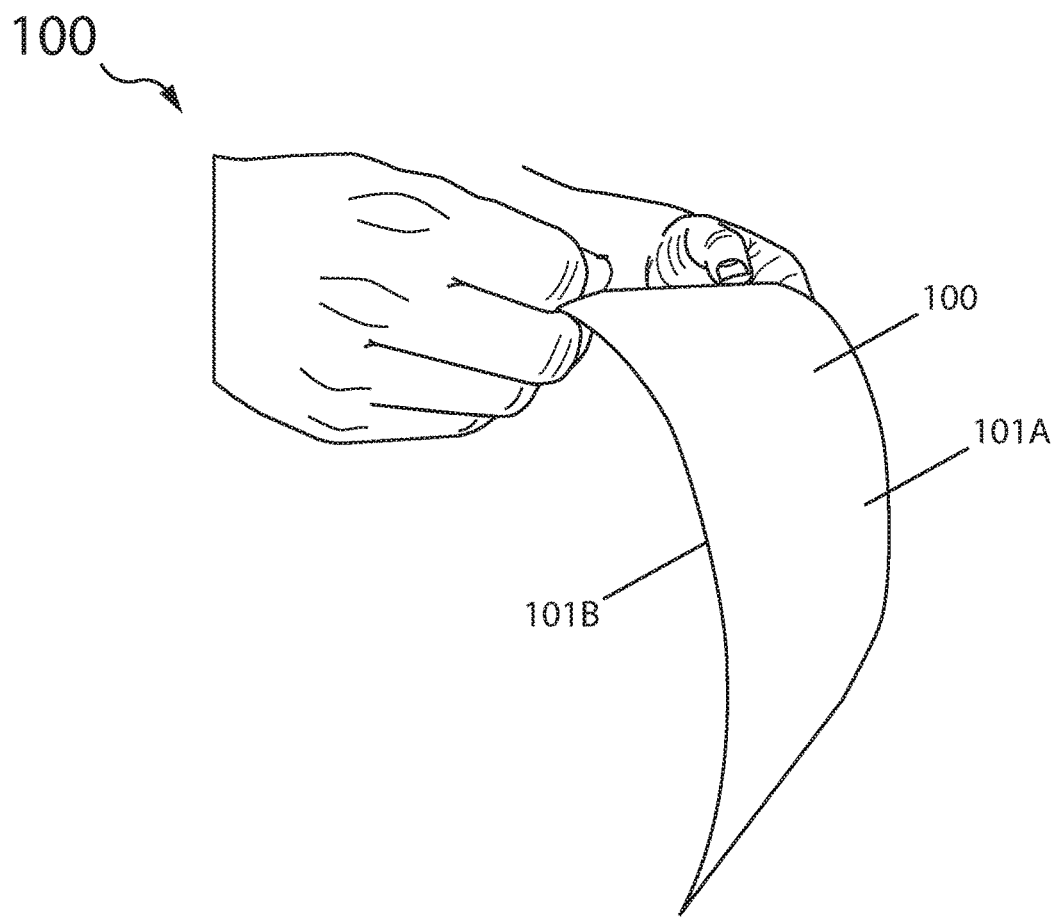

Reference will now be made in detail to specific embodiments of the disclosure. Examples of the specific embodiments are illustrated in the accompanying drawings. While the disclosure will be described in conjunction with these specific embodiments, it will be understood that it is not intended to limit the disclosure to such specific embodiments. On the contrary, it is intended to cover alternatives, modifications, and equivalents as may be included within the spirit and scope of the disclosure. In the following description, numerous specific details are set forth in order to provide a thorough understanding of the present disclosure. The present disclosure may be practiced without some or all of these specific details. In other instances, well known process operations have not been described in detail so as to not unnecessarily obscure the present disclosure.

A standalone lithium ion-conductive solid electrolyte in accordance with this disclosure can include a freestanding inorganic vitreous sheet of sulfide-based lithium ion conducting glass capable of high performance in a lithium metal battery by providing a high degree of lithium ion conductivity while being highly resistant to the initiation and/or propagation of lithium dendrites. Such an electrolyte is also itself manufacturable, and readily adaptable for battery cell and cell component manufacture, in a cost-effective, scalable manner.

With reference to FIGS. 1A-F there are illustrated freestanding vitreous sheets of sulfide-based lithium ion conducting glass 100 in accordance with various embodiments of this disclosure, as described herein. The glass electrolyte sheets are highly conductive of Li ions, with intrinsic room temperature Li ion conductivity $\geq 10^{-5}$ S/cm, preferably $\geq 10^4$ S/cm, and more preferably $\geq 10^{-3}$ S/cm. Moreover, the sheets have physical dimensions and features suitable or particularly adapted for service as a separator in a battery cell, including substantially uniform thickness (t) of no more than 100 µm, scalability to long continuous lengths (e.g., >50 cm) and large areas (e.g., >100 cm$^2$), manufacturably adjustable area aspect ratios, and flexibility commensurate with winding.

By "substantially uniform thickness" it is generally meant that the thickness of the referenced article is sufficiently uniform for its intended purpose; for example the thickness of the solid electrolyte sheet is sufficiently uniform for its intended purpose as a solid electrolyte sheet in a battery cell. When using the term "uniform thickness" (e.g., with respect to the thickness of the solid electrolyte sheet or a fluid stream of glass) it is meant that the thickness variation is at most 20% of the average thickness (t), and more preferably less. In embodiments, wherein the average thickness is 250 µm≤t<500 µm, the thickness variation is preferably ≤2%, and more preferably ≤1%; in embodiments wherein the average thickness is 100 µm≤t<250 µm, the thickness variation is preferably ≤5%, and more preferably ≤2%; in embodiments wherein the average thickness is 50 µm≤t<100 µm the thickness variation is preferably ≤10%, and more preferably ≤5%, and more preferably ≤2%; in embodiments wherein the average thickness is 10 µm≤t<50 µm the thickness variation is preferably ≤20%, more preferably ≤10%, even more preferably ≤5%; and yet even more preferably ≤2%; and in embodiments wherein the average thickness is 5 µm≤t<10 µm the thickness variation is preferably ≤20%, more preferably ≤10%, and even more preferably ≤5%.

In particular embodiments, glass sheet 100 is formed as a long flexible ribbon with substantially parallel lengthwise edges, and length (l) to width (w) area aspect ratio (l/w)≥10, and therefore suitable as a continuous separator in a battery cell with a wound or folded construction. Preferably, the ribbon is sufficiently robust when flexed to have a bending radius ≤10 cm, preferably ≤5 cm, more preferably ≤2.5 cm, even more preferably ≤1 cm, and yet even more preferably ≤0.5 cm, and thus capable of being wound as such without fracture.

In various embodiments sheet 100 has substantially parallel lengthwise edges and an area footprint ≥10 cm$^2$, ≥25 cm$^2$, ≥50 cm$^2$, ≥100 cm$^2$, or ≥1000 cm$^2$. In various embodiments, sheet 100 has length dimension ≥10 cm, ≥20 cm, ≥30 cm, ≥50 cm, or ≥100 cm. In various embodiments, the width dimension of the sheet is between 1 to 5 cm (e.g., about 1 cm, about 2 cm, about 3 cm, about 4 cm, or about 5 cm wide) or between 5 to 10 cm (e.g., about 5 cm, or about 6 cm, or about 7 cm, or about 8 cm or about 9 cm, or about 10 cm wide). In various embodiments the solid electrolyte sheet is in the shape of a thin ribbon having length (l)>10 cm, width (w) between 1 to 10 cm, and area aspect ratio (l/w)≥10, or ≥20. The sheet may be cut into pieces of any suitable size for use, such as a separator in into a battery cell or component.

Continuing with reference to FIGS. 1A-F, sheet 100 is embodied as a freestanding inorganic vitreous glass sheet that is not surrounded or supported by a substrate, and thus sheet 100 is substrate-less and capable of being stored, transported and integrated into battery cell manufacturing processes as a standalone solid electrolyte separator or cell component. By use of the term freestanding when referring to the sulfide glass sheet, it is meant that the sheet is a self-supporting layer of substantially uniform sulfide glass composition. Accordingly, in various embodiments a freestanding solid electrolyte sheet is substrate-less. By use of the term standalone (e.g., "standalone vitreous glass sheet" or "standalone lithium ion-conductive solid electrolyte") it is meant that the referenced material or article (e.g. sheet or electrolyte) is a discrete battery cell component, and thus is not, or has not yet been incorporated in a battery cell or an electrode assembly.

In various embodiments, sheet 100 is fabricated to ensure that it is substantially impervious to liquids that it may contact during operation of a device in which it is incorporated, such as a liquid electrolyte in a battery cell. Accordingly sheet 100 should be free (i.e., devoid) of through porosity including pinholes or defects that would allow a liquid electrolyte to seep across the sheet. In other embodiments liquid impermeability is not a requisite property of the solid electrolyte sheet; for instance, sheet 100 incorporated as a separator in a fully solid-state Li-ion battery cell. In such cases the sheet 100 may nevertheless be substantially impenetrable, by which it is meant, as it pertains to lithium metal dendrites within the context of the described solid electrolytes configured in a lithium battery cell, that over the service life of the battery cell, lithium metal dendrites are unable to penetrate across the sheet, and preferably cannot extend deeply or at all into the bulk of the solid electrolyte sheet (e.g., beyond 10% of the sheet thickness), and in this way the referenced battery cell is resistant to electrical shorting and fracture that might otherwise result from dendritic in-growth of lithium metal into pre-existing flaws or microstructural features on or nearby the sheet surface.

In various embodiments, sheet 100 is fabricated to be highly resistant against initiation and propagation of lithium dendrites. Without intending to be limited by theory it is believed that the ability of the solid electrolyte sheet to resist and preferably prevent dendritic through penetration in a lithium battery cell is based on its fabrication as a vitreous glass with liquid-like surfaces, by which it is meant a smooth amorphous surface, as resulting from the action of surface tension on a quiescent liquid. And by vitreous it is meant a glass derived from a continuous solidified glass melt (e.g., as opposed to a powder compact), and therefore lacking powder particle, inter-particle boundary, and contiguous void manifestations of a pressed powder compact extending between the first and second principal surfaces of the glass sheet, and the liquid-like surface lacks flaw manifestations of a pressed powder compact that are sufficient to initiate Li dendrite penetration. Preferably the liquid-like surface of the vitreous sheet is essentially free of crystalline phases and of exceptionally smooth topography, having an average surface roughness $R_a$<0.1 um, preferably <0.05 um, more preferably $R_a$<0.01 um, and even more preferably $R_a$<0.005 um, and yet even more preferably $R_a$<0.001 um.

The vitreous solid electrolyte glass sheet of this disclosure addresses numerous shortcomings of pressed/hot-pressed sulfide glass powder compacts, polycrystalline ceramic membranes (e.g., garnets), and solid polymer electrolyte films (e.g., PEO-like).

In various embodiments, solid electrolyte sheet 100 is excised from the high quality center portion of a mother-sheet. For instance, with reference to FIGS. 1 E-F, there is illustrated a mother-sheet of vitreous Li ion conducting monolithic sulfur-containing glass made, for instance, by melt downdraw or preform-draw. Mother-sheet 100M may be characterized as having a high quality center region (or portion) 105 and lower quality edge portions 107, and solid electrolyte sheet 100 is excised from the mother sheet by removing the edge portion(s) 107; typically, by cutting (e.g., by scoring, or slicing the edges off with a laser beam or wire saw). Generally, mother-sheet 100M is annealed to remove stresses prior to slicing off the low quality edge portions, as illustrated in FIG. 1F. Moreover, to ensure utmost quality, peripheral portions of the high quality center region 105x may also be removed by the lengthwise cutting procedure.

Preferably the high quality center portion of mother-sheet 100M has sufficient surface quality to circumvent the need to perform a post-solidification polishing step. For instance, in various embodiments, the major opposing surfaces of the high quality center portion of mother-sheet 100M has an average surface roughness $R_a \leq 1.0$ µm, preferably $\leq 0.5$ µm, more preferably $R_a \leq 0.2$ µm, $R_a \leq 0.1$ µm, $R_a \leq 0.05$ µm, and even more preferably $R_a \leq 0.05$ µm, and yet even more preferably $R_a \leq 0.01$ µm.

In addition to high surface quality, as described above, preferably the thickness and thickness uniformity of high quality center portion 107 is of a pre-determined value, thereby circumventing the extra processing step of grinding down the surface(s) or slicing within the plane of the sheet, or even more generally removing material from surfaces 101A/101B in order to achieve the desired thickness and thickness uniformity of solid electrolyte sheet 100.

In various embodiments, in addition to having high surface quality and/or a pre-determined and uniform thickness the major surfaces of the high quality center portion of mother-sheet 109 is preferably chemically and physically pristine in its virgin state, and thus untouched by a foreign solid surface upon solidifying.

For example, powder compaction is fraught with mechanical and electrochemical complications related to surface flaws, inter-particle boundaries and an undue density of void-like defects, which act as stress concentrators that limit strength, thwart flexibility and serve as Li dendrite initiators and facile pathways for dendritic shorting. And while simultaneous heating and pressing (i.e., hot pressing) at high pressures for extended times can be useful for improving inter-particle cohesion, it adds a costly additional step that complicates processing and does not adequately address surface flaws related to dendrite initiation, as further described below. Moreover, powder compaction, while suitable for making small pressed pellets, is a batch process that is not scalable, and cannot be used to make long flexible sheets of glass.

Mechanical failure of any glass (e.g., window glass) will occur when the stress and defect size reach a critical combination. The reliability is therefore statistical, but nonetheless related to the largest sized flaws on the surface. In contrast, small shallow flaws are perceived as less important, since the underlying mechanical strength of the sheet is largely unaffected by their existence. When shallow flaws are small in number density, or even singular, their very existence is generally considered insignificant from a practical perspective.

Figure 2:
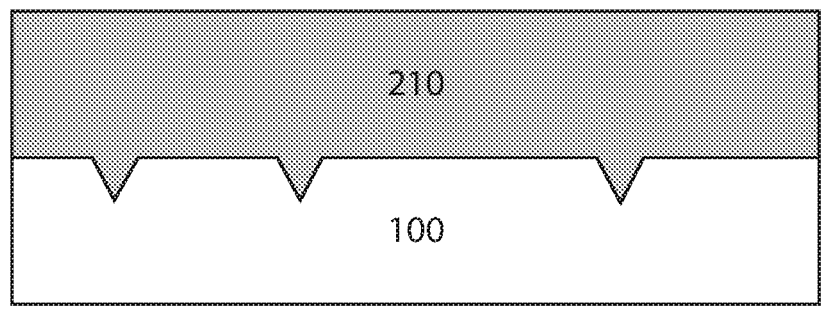
FIG. 2 illustrates surface defects at the interface between a sulfide-based glass and Li metal.

At practical current densities however, as described further herein, a shallow flaw at an otherwise liquid-like surface can be prohibitive for realizing a dendrite resistant solid electrolyte glass sheet, if the flaw depth is beyond a threshold size for dendrite initiation. With reference to FIG. 2, in a lithium metal battery cell, wherein a vitreous solid electrolyte sheet 100 is in contact with a solid Li metal layer 210, a flaw extending beyond a threshold depth can create a highly localized hot spot for current focusing, which can lead to very high local current densities and dendritic penetration of Li metal into the sheet during cell charging, even for electrolytes with elastic moduli well above 20 GPa.

The threshold flaw depth is determined by several factors, including the detailed flaw geometry, the effective fracture toughness of the electrolyte, $K_{1c}^{eff}$ which is typically less than the fracture toughness determined from a mechanical fracture test, $K_{1c}$, the sheet thickness (t), and the local current density, $I_{local}$, which in turn is proportional to the nominal lithium anode current density, $I_{nominal}$. The general functional relationship for the nominal lithium anode current densities, $I_{thr}$, may be expressed as $$I_{thr} = f(K_{1c}^{eff}, t/(\Gamma, \nu, J_{local}))$$

where
$K_{1c}^{eff}$ is the effective fracture toughness at the flaw tip where flaw extension most readily occurs
$\Gamma$ is the deepest flaw extension into the solid electrolyte
t is the sheet thickness
$\nu$ is the viscosity or the equivalent flow stress (both temperature dependent) of the solid lithium, and
$I_{local}$ is the solid electrolyte/lithium metal anode interface current density in the immediate vicinity of the surface flaw. Typically $I_{local} > I_{nominal}$.

To mitigate dendrite propagation through a solid electrolyte sheet having a liquid-like surface in direct contact with a solid Li metal layer, the deepest flaw extension $\Gamma$ into the sheet should be less than 1% of the sheet thickness, and preferably less than 0.1%, and generally no more than 5 µm. For example, the deepest flaw extension in a 100 µm thick sheet should be less than 1 µm, and preferably less than 0.1 µm; and for a 50 µm thick sheet it should be less than 0.5 µm, and preferably less than 0.05 µm.

Moreover, threshold current densities associated with dendrite initiation can be determined experimentally, or can be estimated from analytical approximations to the associated fracture mechanics-electrochemical problem. Typical experiments on polycrystalline solid electrolytes in direct contact with solid Li metal anodes have typically shown threshold charging current densities for dendrite initiation below 0.5 mA/cm². In contrast, vitreous sulfide solid electrolytes with smooth interfaces, such as prepared by the methods contemplated herein, have surprisingly sustained current densities in excess of 2 mA/cm² without dendrite penetration, when cycling 2 mAh/cm² of lithium metal for over 50 cycles. Subject to these principles, the inventors are now able to characterize the surface quality of the sheet based on experimentally determined values for $I_{thr}$, by cycling a solid Li metal layer against the solid electrolyte sheet at 1 mAh/cm² for at least 50 charge cycles without propagating a dendrite across the sheet. In various embodiments the solid electrolyte sheet is characterized as having a surface quality commensurate with an $I_{thr}$ no less than 1 mA/cm², preferably no less than 2 mA/cm², more preferably $I_{thr}$ is no less than 3 mA/cm², even more preferably $I_{thr}$ is no less than 4 mA/cm², and yet even more preferably $I_{thr}$ is no less than 5 mA/cm².

Considering the sensitivity of dendrite initiation to the presence of shallow flaws, in order for the vitreous solid electrolyte sheet to retain its $I_{thr}$ value during handling and downstream processing of cell components and cells, special care should be given to minimize contact damage.

Vitreous Web of Solid Electrolyte Sulfide Glass

Figure 3A:
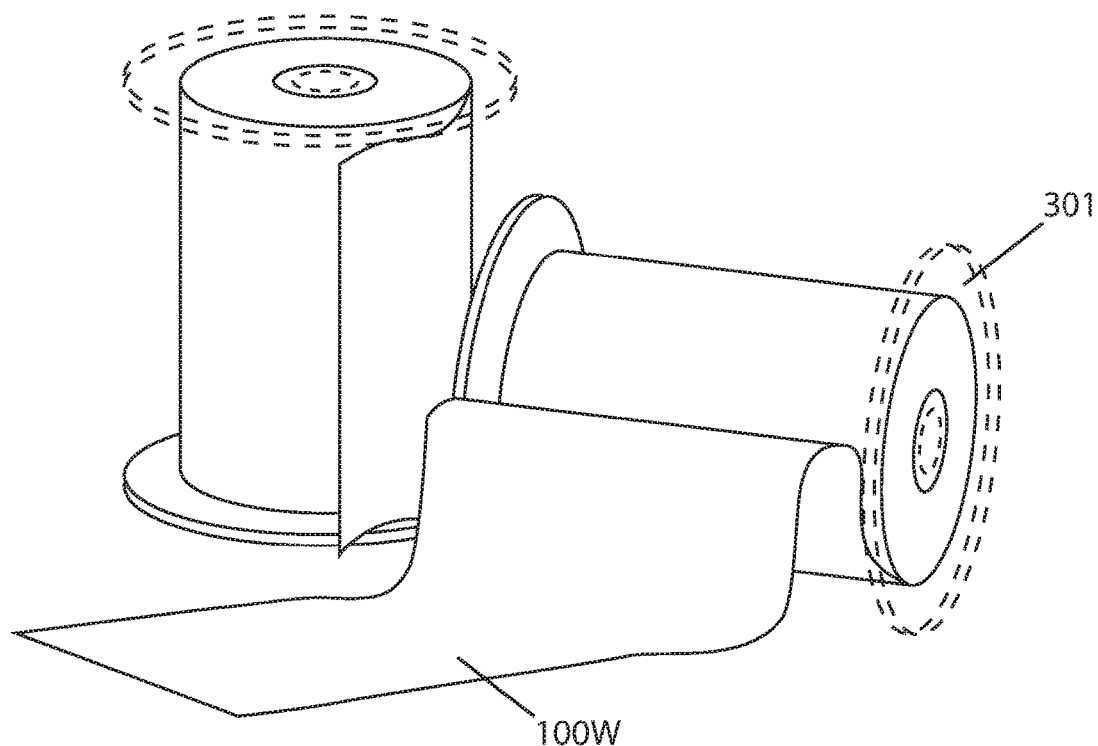
FIG. 3A illustrates a continuous roll of the instant solid electrolyte sheet wound on a spool.

With reference to FIG. 3A, in various embodiments the solid electrolyte sheet may be of sufficient flexibility, length and manufacturability to be fabricated as a continuous web of vitreous inorganic Li ion conducting sulfide glass 100W, having a length typically greater than 50 cm, and preferably greater than 100 cm, and even more preferably greater than 1000 cm long. In various embodiments, glass web 100W serves a solid electrolyte substrate-sheet for the formation of downstream battery cell components, including electrode subassemblies, electrode assemblies, and battery cells of this disclosure.

As illustrated in FIG. 3A, in various embodiments web 100W is sufficiently flexible that it may be formed into a continuous roll 100R without fracture, and typically wound on a support spool 301 for storage and/or transportation. Preferably continuous web 100W has bending radius ≤100 cm, and preferably ≤50 cm, more preferably ≤10 cm, even more preferably ≤5 cm, and yet even more preferably ≤2.5 cm, and thus capable of being wound as such without fracture. In various embodiments the spool or drum has a diameter in the range of 100 cm-200 cm; or 50 cm to 100 cm; or 20 to 50 cm; or 10 cm to 20 cm; or 5 cm to 10 cm; or 2.5 cm to 5 cm. In various embodiments continuous roll 100R serves as a supply roll or a source roll for R$_2$R manufacture or roll-to-sheet processing of downstream battery cell components and battery cells.

Figure 3B:
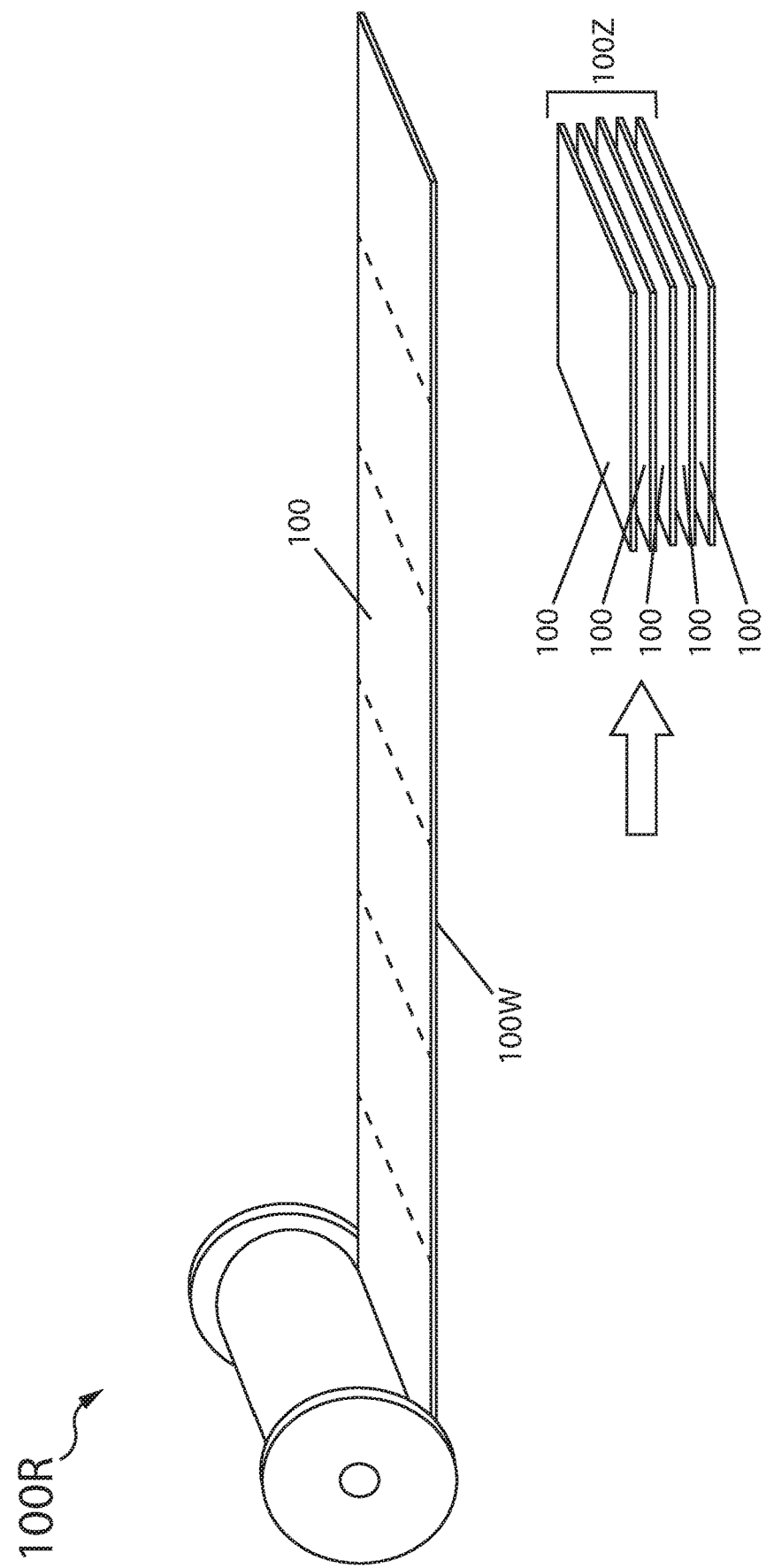
FIG. 3B illustrates a continuous roll of a freestanding Li ion conducting solid electrolyte sheet in the form of a web from which individual discrete solid electrolyte sheets are excised and stacked.

As illustrated in FIG. 3B, in various embodiments, multiple discrete solid electrolyte sheets 100Z (e.g., a stack of solid electrolyte sheets) may be excised (i.e., cut to size) from Li ion conducting glass web 100W. The sheet may be cut into pieces of any suitable size for use, such as a separator in into a battery cell or component. In various embodiments, web 100W yields at least 5 discrete solid electrolyte sheets having length of at least 10 cm, preferably at least 10 such sheets, more preferably at least 50 such sheets, and even more preferably at least 100 such sheets.

In various embodiments, to facilitate winding, storage and/or use of a supporting spool, a protective material interleave (not shown) may be disposed between adjacent layers of the source roll in order to prevent the opposing web surfaces from contacting each other. Generally, the protective interleave is not a lithium ion conductor. In various embodiments the interleave may be a porous polymer layer (e.g., micro-porous) or a dry swellable polymer layer (i.e., a dry gellable polymer layer), suitable to serve as both interleave in the source roll and as a porous or gel battery separator component in a battery cell.

Thermal Parameters

Recognizing the benefit of perfecting the sulfide glass into a vitreous glass sheet, as opposed to a powder construct, methods and modified sulfur-containing glass compositions that are less prone to crystallization and/or have higher melt viscosities but still retain a requisite level of Li ion conductivity (>10$^{-5}$S/cm) have been developed. In particular, methods of increasing the glass stability factor and/or Hruby parameter, including increasing the amount of oxygen in the glass, increasing the oxygen to sulfur mole ratio, increasing the amount of oxide network former in the glass, increasing the ratio of oxide network former to sulfide network former, incorporating intermediate network formers, decreasing the amount of bond breaking lithium ions, tuning the composition of the base sulfide glass to have more than 4 main elemental constituents (e.g., 5 main elemental constituents: S, Li, B, P, and O) or more than 5 main elemental constituents (e.g., 6 main elemental constituents: S, Li, Si, B, P, and O) and combinations thereof are described. In addition, additives to the base glass are also contemplated for use herein as devitrifying agents and crystallization inhibitors.

Moreover, while apparently counterintuitive to decrease the Li ion conductivity of a glass that is specifically intended for use in a battery cell as a Li ion conductor, in various embodiments this is the approach contemplated herein for making and improving properties of the vitreous solid electrolyte glass sheets of this disclosure. Accordingly, in various embodiments the composition of the sulfide base glass system is adjusted to enhance thermal properties at the sacrifice of reduced conductivity.

A number of terms are used in the description for discussing the thermal properties of the glass. $\{T_x-T_g\}$ is the difference between the onset of crystallization ($T_x$) and the glass transition temperature ($T_g$), and is also referred to herein as the glass stability factor; $\{T_n-T_x\}$ is the difference between the temperature at which the glass is drawn ($T_n$) and the onset of crystallization. The liquidus temperature is ($T_{liq}$). The melting temperature of the glass is ($T_m$). The strain temperature is the temperature at which the viscosity of the glass is approximately $10^{14.6}$ poise, and stresses may be relieved in hours. The annealing temperature is the temperature at which the viscosity is approximately $10^{13.4}$ poise, and stresses in a glass may be relieved in less than 1 hour or minutes. And finally, the softening temperature is defined as the temperature at which the glass has viscosity of $\sim 10^{7.6}$ poise. The glass is usually suitable for drawing at or above this temperature.

Several techniques exist for the measurement of these characteristic temperatures. Differential scanning calorimetry (DSC) and differential thermal analysis (DTA) are the most common. Generally, a large separation between $T_x$ and $T_g$ (i.e., a large glass stability factor) is desirable for drawing glass.

Another method of determining or estimating glass stability is through the Hruby parameter ($H_r$ parameter), as given by the following equation:

$$Hr = \frac{Tx - Tg}{Tm - Tc}$$

A high value of $H_r$ suggests high glass stability, and the larger, the more stable the glass against crystallization. For example, a glass having $H_r<1$, is generally highly prone to crystallization and considered unstable.

Vitreous Sulfide Glass Composition

In accordance with the disclosure, the Li ion conducting vitreous glass has room temperature intrinsic Li ion conductivity ≥10$^{-5}$S/cm, preferably ≥10'S/cm, and more preferably ≥10$^{-3}$S/cm. By use of the term intrinsic when referring to the ionic conductivity of a material it is meant the inherent conductivity of the material itself, in the absence of any other additional material agents, such as, for example, liquid solvents or organic molecules or organic material phases. To achieve this level of conductivity in an inorganic amorphous material phase, sulfide based Li ion conducting glasses are particularly suitable (i.e., sulfur-containing glasses). Without intending to be limited by theory, compared to oxygen, sulfur is found to be a highly desirable element of the material phase. Sulfur is generally more polarizable than oxygen, and this tends to weaken the interaction between glass forming skeletal ions and mobile lithium ions, which in turn enhances lithium ion mobility and increases associated ionic conductivity. Accordingly, in various embodiments the material phase has a glass skeleton composed in part of sulfur and through which Li ions move. Without intending to be limited by theory, sulfur may serve several roles, including cross-linking sulfur that forms the glass structure and non-crosslinking sulfur that combines terminally with mobile Li ions.

Accordingly, in various embodiments the continuous amorphous material phase of solid electrolyte sheet 100 is an inorganic sulfide based glass comprising S (sulfur) as a main constituent element, Li (lithium) as a main constituent element and further comprising one or more $M_1$ main constituent elements selected from the group consisting of P (phosphorous), B (boron), Al (aluminum), Ge (germanium), Se (selenium), As (arsenic), O (oxygen) and Si (silicon).

In embodiments, the sulfide based solid electrolyte material further comprises O (oxygen) as a constituent element (e.g., typically as a secondary constituent element). In other embodiments, the amorphous sulfide glass is a non-oxide, and thus substantially devoid of oxygen as a constituent element. Typically the mol % of Li in the glass is significant, and in particular embodiments the mole percent of Li in the glass is at least 10 mol %, and more typically at least 20 mol % or at least 30 mol %; in some embodiments it is contemplated that the mole percent of Li in the glass is greater than 40 mol % or greater than 50 mol % or even greater than 60 mol %. In various embodiments the glass is devoid of alkali metal ions other than Li.

In various embodiments as a main constituent element of the glass, sulfur (S) is present to at least 10 mol %, and typically significantly higher; for instance, >20 mol % of S, or >30 mol % of S, or >40 mol % of S. In various embodiments the concentration of sulfur as a main constituent element in the glass is between 20-60 mol %, or between 30%-50 mol % (e.g., about 25 mol %, about 30 mol %, about 35 mol %, about 40 mol %, about 45 mol %, or about 50 mol %). In various embodiments sulfur is the major elemental constituent of the glass, which is to mean the mol % of sulfur is greater than that of any other constituent element.

Various Li ion conducting sulfur based glasses (i.e., sulfur-containing glasses) are contemplated for use herein. These include lithium phosphorous sulfide, lithium phosphorous oxysulfide, lithium boron sulfide, lithium boron oxysulfide, lithium boron phosphorous oxysulfide, lithium silicon sulfide, lithium silicon oxysulfide, lithium germanium sulfide, lithium germanium oxysulfide, lithium arsenic sulfide, lithium arsenic oxysulfide, lithium selenium sulfide, lithium selenium oxysulfide, lithium aluminum sulfide, lithium aluminum oxysulfide, and combinations thereof.

In various embodiments the sulfur glass, in addition to the main glass constituent elements, includes certain additives and compounds to enhance conductivity, such as halide salts (e.g., LiCl, LiBr, LiI), aluminum (e.g., aluminum oxide as an intermediate network former), $Ga_2S_3$, $Al_2S_3$, nitrogen (e.g., thio-nitrides), as well as phosphate (e.g., lithium phosphate (e.g., $Li_3PO_4$, $LiPO_3$), sulfate (e.g., $Li_2SO_4$), silicate (e.g., $Li_4SiO_4$) and borate salts (e.g., $LiBO_3$). In embodiments, various devitrifying agents may be added to the sulfide glass to enhance its stability against crystallization.

The sulfur-based glasses are sometimes described herein within the context of the glass system to which they belong, and roughly based on the stoichiometry of the materials incorporated in the glass as main and secondary elemental constituents, without reference to additives.

In various embodiments the sulfide glass system is of a type $Li_2S$—$YS_n$ wherein Y is a glass former constituent element and may be Ge, Si, As, B, or P; and wherein n=2, 3/2 or 5/2. For example, in various embodiments the glass system may be $Li_2S$—$PS_{5/2}$ or $Li_2S$—$BS_{3/2}$ or $Li_2S$—$SiS_2$. In various embodiments the glass system may be a combination of two or more such systems; for example, $Li_2S$—$PS_{5/2}$—$BS_{3/2}$ or $Li_2S$—$PS_{5/2}$—$SiS_2$ or $Li_2S$—$PS_{5/2}$—$BS_{3/2}$—$SiS_2$.

In various embodiments the sulfide glass system is of a type $Li_2S$—$YS_n$—$YO_n$ wherein Y is a glass former constituent element, and may be Ge, Si, As, B, or P; and wherein n=2, 3/2 or 5/2. For example, in various embodiments the glass system may be $Li_2S$—$PS_{5/2}$—$PO_{5/2}$ or $Li_2S$—$BS_{3/2}$—$BO_{3/2}$ or $Li_2S$—$SiS_2$—$SiO_2$.

In various embodiments the sulfide glass system is of a type $Li_2S$—$Y^1S_n$—$Y^2O_m$ wherein $Y^1$ and $Y^2$ are different glass former constituent elements, and may be Ge, Si, As, B, or P; and wherein n=2, 3/2 or 5/2 and m=2, 3/2 or 5/2, as appropriate based on the common standard valence of the constituent element. For example, in various embodiments the glass system may be $Li_2S$—$PS_{5/2}$—$BO_{3/2}$ or $Li_2S$—$BS_{3/2}$—$PO_{5/2}$ or $Li_2S$—$PS_{5/2}$—$SiO_2$.

In various embodiments the glass system may be a combination of two or more such systems of the type $Li_2S$—$YS_n$ and $Li_2S$—$Y^1S_n$—$Y^2O_m$; wherein Y is a glass former constituent element, and may be Ge, Si, As, B, or P; $Y^1$ and $Y^2$ are different glass former constituent elements, and may be Ge, Si, As, B, or P; and wherein n=2, 3/2 or 5/2 and m=2, 3/2 or 5/2, as appropriate based on the common standard valence of the constituent element.

In various afore said embodiments, $Li_2S$ may be wholly or partially substituted for by $Li_2O$.

Specific sulfur-based glass systems contemplated are of the type $Li_2S$—$YS_n$; $Li_2S$—$YS_n$—$YO_n$ and combinations thereof; for which Y=Ge, Si, As, B, and P; and n=2, 3/2, 5/2. Specific systems include $Li_2S$—$P_2S_5$; $Li_2S$—$B_2S_3$; $Li_2S$—$SiS_2$; $Li_2S$—$P_2S_5$—$P_2O_5$; $Li_2S$—$P_2S_5$—$P_2O_3$; $Li_2S$—$B_2S_3$—$B_2O_3$; $Li_2S$—$P_2S_5$—$B_2S_3$; $Li_2S$—$P_2S_5$—$B_2S_3$—$B_2O_3$, $Li_2S$—$B_2S_3$—$P_2O_5$; $Li_2S$—$B_2S_s$—$P_2O_3$; $Li_2S$—$SiS_2$—$P_2O_5$; $Li_2S$—$P_2S_5$—$SiO_2$; $Li_2S$—$P_2S_5$—$P_2O_5$—$B_2S_3$—$B_2O_3$ and combinations thereof.

The continuous Li ion conducting inorganic glass may be described as having a glass network former that brings about the skeletal lattice and a glass network modifier, such as a lithium compound, that introduces ionic bonds and thereby serves as a disrupter of the lattice and provides mobile lithium ions for conduction. In various embodiments additional network formers may be incorporated in the glass. For instance, in various embodiments the glass system may have the general formula:

xNET(major former): yNET(minor former): zNET (modifier)

wherein z=1−(x+y)

NET(major former) is the major glass network former and its mole fraction, x, is the largest of all the network formers used to make the glass. Net(minor former) represents one or more minor glass network formers that is present in the glass with mole fraction, y. In all instances the mole fraction of the major glass former is larger than that of any minor glass former. However, the combined mole fraction of the minor glass formers may be greater than that of the major glass former. NET(modifier) is generally $Li_2S$ or $Li_2O$ or some combination thereof.

The network former (major or minor) may be a compound of the type $A_aR_b$, or a combination of two or more different compounds of this type. For instance, A may be Silicon, Germanium, Phosphorous, Arsenic, Boron, Sulfur and R may be Oxygen, Sulfur, or Selenium; and the network modifier may be of the type $N_mR_c$, with N being Lithium and R being Oxygen, Sulfur, or Selenium; and a, b, m, and c represent the indices corresponding to the stoichiometry of the constituents.

In various embodiment the major network former is $B_2S_3$, $P_2S_5$ or $SiS_2$, and the minor network former is one or more of $B_2O_3$, $P_2O_5$, $P_2O_3$, $SiO_2$, $B_2S_3$, $P_2S_5$, $SiS_2$, $Al_2S_3$, $Li_3PO_4$, $LiPO_3$ $Li_2SO_4$ $LiBO_3$. Specific examples include: i) $Li_2S$ as the network modifier, $B_2S_3$ as the major former, and one or more minor formers selected from the group consisting of $B_2O_3$, $P_2O_5$, $P_2O_3$, $SiO_2$, $P_2S_5$, $SiS_2$, $Al_2S_3$, $Li_3PO_4$, $LiPO_3$ $Li_2SO_4$ $LiBO_3$; ii) i) $Li_2S$ as the network modifier, $P_2S_5$ as the major former, and one or more minor formers selected from the group consisting of $B_2O_3$, $P_2O_5$, $P_2O_3$, $SiO_2$, $B_2S_3$, $SiS_2$, $Al_2S_3$, $Li_3PO_4$, $LiPO_3$ $Li_2SO_4$ $LiBO_3$; iii) $Li_2S$ as the network modifier, $SiS_2$ as the major former, and one or more minor formers selected from the group consisting of $B_2O_3$, $P_2O_5$, $P_2O_3$, $SiO_2$, $P_2S_5$, $B_2S_3$, $Al_2S_3$, $Li_3PO_4$, $LiPO_3$ $Li_2SO_4$ $LiBO_3$. In various embodiments, the network modifier is $Li_2S$ or $Li_2O$, or some combination thereof.

Selecting the appropriate sulfide glass composition depends on the end of use of the solid electrolyte sheet, and ultimately on the type and application of the battery cell in which it is intended to operate. Among the many potential considerations are form factor, cell construction, cost, power requirements, and service life. Accordingly, the glass composition may be adjusted to enhance one or more of i) chemical and electrochemical compatibility of the glass in direct contact with Li metal and/or a liquid electrolyte; ii) flexibility, shape and size; iii) glass formability (especially as it relates to thermal properties); and iv) Li ion conductivity. Optimizing one or more of these parameters generally requires a tradeoff.

In various embodiments the sulfide glass system is selected for its chemical and electrochemical compatibility in direct contact with lithium metal.

Chemical compatibility to Li metal is an attribute that relates to the kinetic stability of the interface between glass sheet 100 and a lithium metal layer, and electrochemical compatibility generally assesses the ability of that interface to function in a battery cell. Both properties require the formation of a solid electrolyte interphase (SEI) that stops reacting with the glass surface once formed (i.e., chemical compatibility) and is sufficiently dense and conductive that its interface resistance is acceptable for its use in a battery cell.

Incorporating certain constituent elements into glass sheet 100 is desirable for creating an SEI commensurate with both chemical and electrochemical compatibility. In various embodiments, phosphorous is incorporated as a main constituent element for producing an effective SEI, as phosphorous in direct contact with lithium metal reacts to form lithium phosphide (e.g., $Li_3P$), a compound highly conductive of Li ions and fully reduced. To form an acceptable SEI, phosphorous may be present in small amount (e.g., as a secondary constituent of the glass). Adding phosphorous as a secondary constituent element provides an effective method for reducing resistance at the interface, and may be used to effect compatibility in a glass system, which, in the absence of phosphorous does not form a stable SEI, such as silicon sulfide glass systems with $SiS_2$ or $SiO_2$ as a primary network former. In other embodiments, however, Si may be intentionally excluded as a constituent element of sulfide glass sheet 100.

Notably, it has been discovered that phosphorous sulfide glass systems are not the only glasses chemically and electrochemically compatible in direct contact with Li metal. Surprisingly, boron sulfide glasses, even in the absence of phosphorous, have shown remarkable chemical and electrochemical compatibility against metallic lithium. Accordingly, in various embodiments phosphorous may be excluded from the glass as a constituent element, mitigating potential issues associated with high vapor pressure of the melt and chemical reactivity. However, in small amount, adding phosphorous as a secondary constituent element to the boron sulfide glasses should not impart processing issues, and may be used, as described below, as a method for reducing resistance at the Li metal solid electrolyte interface.

In various embodiments adding oxygen and silicon provides a method for improving thermal properties, especially for enhancing glass formability, including glass stability (e.g., increasing the glass stability factor and/or Hruby parameter) and/or viscosity at the liquidus temperature ($T_{liq}$). For instance, adding silicon as a secondary constituent to a phosphorous sulfide or boron sulfide glass provides a method for increasing glass stability and/or viscosity at $T_{liq}$, while retaining compatibility to Li metal. The addition of oxygen as a constituent element may also afford benefit in these regards. In various embodiments oxygen may be incorporated as a main or secondary constituent element in lithium phosphorous sulfide and lithium boron sulfide glass systems as a method for increasing the glass stability factor and/or Hruby parameter. For instance, $xLi_2S$-$yP_2S_5$-$zSiS_2$, $xLi_2S$-$yB_2S_3$-$zSiS_2$, $xLi_2S$-$yP_2S_5$-$zSiO_2$, $xLi_2S$-$yB_2S_3$-$zSiO_2$, $xLi_2S$-$yB_2S_3$-$zB_2O_3$, $xLi_2S$-$yP_2S_5$-$zP_2O_5$; wherein with $x+y+z=1$ and $x=0.4$-$0.8$, $y=0.2$-$0.6$, and z ranging from 0 to 0.2 (e.g., about 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2).

Solid electrolyte sheets of silicon sulfide based glasses are particularly advantageous for use as a separator sheet in battery cells which employ a common liquid electrolyte or wherein the separator sheet does not contact electroactive material. For instance, $xLi_2S$-$ySiS_2$; $xLi_2S$-$ySiS_2$-$zSiO_2$; $xLi_2S$-$ySiS_2$-$yB_2S_3$; $xLi_2S$-$ySiS_2$-$yB_2O_3$; $xLi_2S$-$y$ $B_2S_3$-$zSiO_2$; wherein with $x+y+z=1$ and $x=0.4$-$0.8$, $y=0.2$-$0.6$, and z ranging from 0 to 0.2 (e.g., about 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2).

With consideration of the above discussion, it is clear that in limited amount certain elements can have a beneficial role for enhancing performance of sheet 100 and/or improving glass stability for processing. The addition of phosphorous can reduce interfacial resistance with Li metal and the addition of oxygen can improve glass stability. In a boron sulfide glass, the addition of phosphorous, as a secondary constituent element, can be made via the incorporation of $P_2S_5$ and the addition of oxygen via $B_2O_3$; yielding the glass system: $Li_2S$—$B_2S_3$—$P_2S_5$—$B_2O_3$; wherein $B_2S_3$ is the primary network former, $P_2S_5$ and $B_2O_3$ are secondary network formers, and $Li_2S$ is the network modifier. As such, the oxygen to phosphorous mole ratio can be varied. In another embodiment the phosphorous and oxygen mole ratio may be constrained by incorporating $P_2O_5$ as a single ingredient, giving rise to the glass system $Li_2S$—$B_2S_3$—$P_2O_5$; wherein $B_2S_3$ is the primary network former, $P_2O_5$ is a secondary former, and $Li_2S$ is the network modifier.

Specific examples include, $0.7Li_2S$-$0.29P_2S_5$-$0.01P_2O_5$; $0.7Li_2S$-$0.28P_2S_5$-$0.02P_2O_5$; $0.7Li_2S$-$0.27P_2S_5$-$0.03P_2O_5$; $0.7Li_2S$-$0.26P_2S_5$-$0.04P_2O_5$; $0.7Li_2S$-$0.25P_2S_5$-$0.05P_2O_5$; $0.7Li_2S$-$0.24P_2S_5$-$0.06P_2O_5$; $0.7Li_2S$-$0.23P_2S_5$-$0.07P_2O_5$; $0.7Li_2S$-$0.22P_2S_5$-$0.08P_2O_5$; $0.7Li_2S$-$0.21P_2S_5$-$0.09P_2O_5$; $0.7Li_2S$-$0.2P_2S_5$-$0.1P_2O_5$; $0.7Li_2S$-$0.29B_2S_3$-$0.01B_2O_3$; $0.7Li_2S$-$0.28B_2S_3$-$0.02B_2O_3$; $0.7Li_2S$-$0.27B_2S_3$-$0.03B_2O_3$; $0.7Li_2S$-$0.26B_2S_3$-$0.04B_2O_3$; $0.7Li_2S$-$0.25B_2S_3$-$0.05B_2O_3$; $0.7Li_2S$-$0.24B_2S_3$-$0.06B_2O_3$; $0.7Li_2S$-$0.23B_2S_3$-$0.07B_2O_3$; $0.7Li_2S$-$0.22B_2S_3$-$0.08B_2O_3$; $0.7Li_2S$-$0.21B_2S_3$-$0.09B_2O_3$; $0.7Li_2S$-$0.20B_2S_3$-$0.1B_2O_3$; $0.7Li_{25}$-$0.29B_2S_3$-$0.01P_2O_5$; $0.7Li_2S$-$0.28B_2S_3$-$0.02P_2O_5$; $0.7Li_2S$-$0.27B_2S_3$-$0.03P_2O_5$; $0.7Li_2S$-$0.26B_2S_3$-$0.04P_2O_5$; $0.7Li_2S$-$0.25B_2S_3$-$0.05P_2O_5$; $0.7Li_2S$-$0.24B_2S_3$-$0.06P_2O_5$; $0.7Li_2S$-$0.23B_2S_3$-$0.07P_2O_5$; $0.7Li_2S$-$0.22B_2S_3$-$0.08P_2O_5$; $0.7Li_2S$-$0.21B_2S_3$-$0.09P_2O_5$; $0.7Li_2S$-$0.20B_2S_3$-$0.1P_2O_5$.

Methods of Making

Vitreous sulfide-based glass sheet 100 may be fabricated using an overflow technique such as fusion draw, which uses a drawing tank and takes advantage of gravity to allow molten glass to flow down the outside surfaces of the tank, and in this way yield two flowing glass surfaces which are joined to form a single flowing sheet.

With reference to the fusion draw apparatus 400A in FIGS. 4A-B, a material batch of Li ion conducting sulfide glass powder, which may be formed by mechanical milling, is heated in a melting vessel wherefrom it is caused to flow (via flow pipes 405) into a trough-like container 407 in an amount sufficient to cause overflow of the melt 409 from both sides of the trough. The opposing flows are then combined by fusion to form a single liquid stream of unbroken continuity 100, which may be fed to drawing equipment (e.g., via edge rollers or glass pulling rods), for controlling the thickness of the sheet, depending upon the rate at which the solidified portion of the sheet is pulled away. Accordingly, the major surfaces of the as-solidified glass sheet, or at least its high quality center portion, are pristine, as they have not contacted any part of the apparatus (e.g., the trough walls or flow pipes), and therefore have superior surface quality. In various embodiments, the fusion draw process may be modified to allow for the drawing of two dissimilar glasses, one optimized for contact with lithium metal and the other optimized for a different purpose(s) or utility such as contact with a positive electrode battery cell component (e.g., a lithium positive electroactive material) or a liquid phase electrolyte, or ease of processing or high conductivity. For instance, a first sulfide glass stream of unbroken continuity (e.g., having as main constituent elements: lithium, sulfur, and silicon) fused to a second sulfide glass stream (e.g., having as main constituent elements: lithium, sulfur, and one or more of boron or phosphorous).

In an alternative process, freestanding solid electrolyte sheet 100 may be formed by slot draw to yield a substantially amorphous vitreous solid electrolyte sheet of Li ion conducting sulfur-containing glass. With reference to FIG. 4C, an apparatus 400C for making the freestanding sheet using a slot drawing process is illustrated. The apparatus includes melting vessel 460, for heating and holding a material batch, typically in powder form (e.g., a powder batch of sulfide glass or a batch of raw precursor powders in proper stoichiometry for making the glass), above the batch melting temperature, and an open slot 470 near the bottom of the tank and through which the batch of molten glass flows by drawing to form continuous glass sheet 100 which may be optionally pulled through rollers 480 for shaping, and optionally traversed into furnace 490 for an annealing heat treatment, and thereafter optionally placed through a second set of rollers 485 and/or subjected to an edge removal process (as described above) to yield the solid electrolyte sheet in its final or near final form.

Additional processing steps may be used to enhance the cooling rate, such as flowing a non-reactive inert fluid (e.g., ultra dry nitrogen or argon) over one or both surfaces, typically a gas (e.g., helium or argon). The cooling gas should have a very low moisture and oxygen content, preferably less than 10 ppm.

In various embodiments vitreous solid electrolyte glass sheet 100 is formed by preform drawing, wherein a preform of the sulfide based solid electrolyte glass is drawn (e.g., pulled) in length at a temperature above the glass transition temperature, to the desired shape and size. Typically, the preform is heated to a temperature at which it has low enough viscosity to deform under its own weight, which is usually at around the softening temperature of the glass. Upon drawing, the heated portion starts to flow, and becomes a highly viscous fluid stream, typically in the range of $10^4$-$10^6$ poise.

Figure 4D:
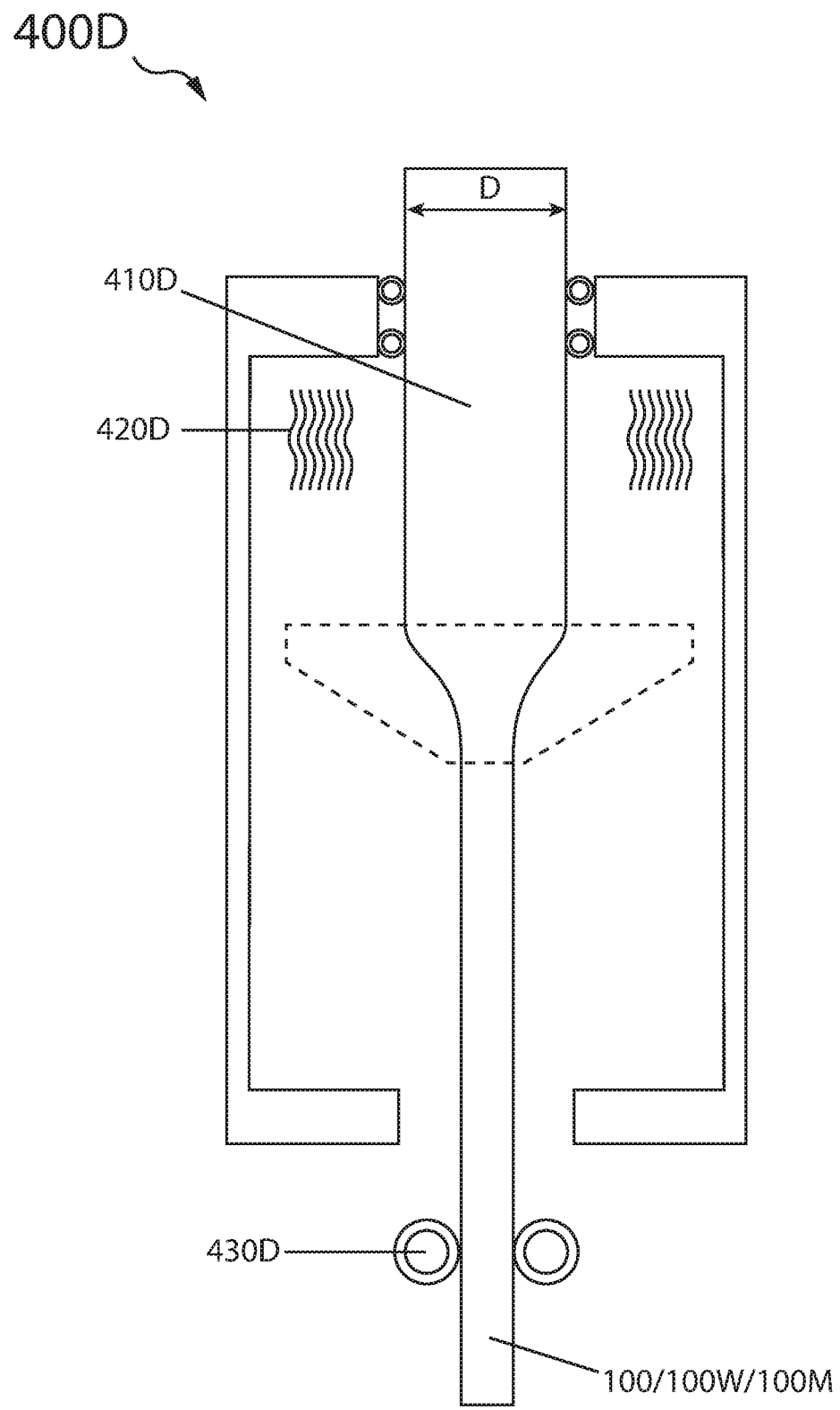

With reference to FIG. 4D there is shown an apparatus 400D suitable for preform draw of a sulfide based solid electrolyte sheet of the instant disclosure, and sometimes referred to as a redraw process. In operation, the vitreous preform 410D is heated in a deformation zone 420D and then drawn using mechanized rollers 430D. Within the deformation zone the preform is exposed to heat sufficient to raise its temperature above $T_g$ but below $T_m$ and preferably below $T_x$, and then drawn to a sheet of desired length and thickness. In some embodiments it is contemplated that the drawing apparatus includes a flow system for flowing an inert gas nearby the drawn sheet in order to speed up cooling of the drawn sheet section, the gas preferably having a very low moisture and oxygen content, as described above.

The resulting cross sectional shape of the formed sheet is usually similar to that of the preform from which it has been drawn. Preferably, the preform has a smooth flat surface with minimal surface roughness and waviness. In various embodiments the preform is, itself, a vitreous glass construct. For instance, the preform may be made by molding molten glass into a rectangular bar-like shape of substantial width and thickness typically 10 times that desired for the sheet. For example, to a draw a thin vitreous solid electrolyte ribbon in the range of 10 to 500 µm thick, in various embodiments the preform is rectangular with a thickness in the range of 200 µm to 1000 µm, a width of 5 to 20 cm, and a length of about 30 cm to 100 cm (e.g., a rectangular shaped bar, about 5 cm wide, about 30 cm long and about 400 um thick). Methods and apparatus' for drawing a glass preform to form a substrate for semiconductor devices and flat panel displays are described in US Pat. Pub. No.: US20070271957, US20090100874; 20150068251; all of which are incorporated by reference herein for the purpose of further describing these glass preform methods.

With reference to FIGS. 5A-C there is illustrated flowcharts representative of various methods 500A-C of making vitreous solid electrolyte sheet 100 using draw processes as described above. Methods 500A-C include a first step of selecting a glass composition 505. For example, the composition may be selected for suitability to the particular draw process of making sheet 100 (e.g., preform draw 550A from a vitreous preform 540A to form a vitreous glass ribbon 560A and/or melt draw 550B from molten glass 540B to form a vitreous glass sheet 560B).

In various methods, the step of selecting the sulfur containing glass composition is based on glass stability factor and conductivity; e.g., selecting a glass composition having a glass stability factor >20° C., or >30° C., or >40° C., or >50° C., or >60° C., or >70° C., or >80° C. or >90° C. or >100° C. and a Li ion conductivity $\geq 10^{-5}$ S/cm, and preferably $\geq 10^{-4}$ S/cm, and more preferably $\geq 10^{-3}$ S/cm.

In various methods, the step of selecting the sulfur containing glass composition is based on Hruby parameter and conductivity; e.g., selecting a glass composition having Hruby parameter >0.4, or >0.5, or >0.6, or >0.7, or >0.8, or >0.9, or >1 and a Li ion conductivity $\geq 10^{-5}$ S/cm, and preferably $\geq 10^{-4}$ S/cm, and more preferably $\geq 10^{-3}$ S/cm.

In various methods the step of selecting the sulfur containing glass composition involves adjusting the mole percent of Li and/or S (sulfur) and/or O (oxygen) and/or Si (silicon) in the glass to achieve a Hruby parameter of >0.5, or >0.6, or >0.7, or >0.8, or >0.9, or >1 and a Li ion conductivity ≥$10^{-5}$S/cm, and preferably ≥10'S/cm, and more preferably ≥$10^{-3}$S/cm.

In various methods the step of selecting the sulfur containing glass composition involves adjusting the mole percent of Li and/or S (sulfur) and/or O (oxygen) and/or Si (silicon) in the glass to achieve a glass stability factor of >50° C., or >60° C., or >70° C., or >100° C. and a Li ion conductivity ≥$10^{-5}$S/cm, and preferably ≥10'S/cm, and more preferably ≥$10^{-3}$S/cm.

In various methods the step of selecting the sulfur containing glass composition involves adjusting the mole percent of O (oxygen) to within a value of 1-20 mol % to achieve a glass stability factor >50° C., or >60° C., or >70° C., or >80° C. or >90° C. or >100° C. while still retaining an interface resistance with a Li metal layer that is no more than 200 Ω-cm², and preferably no more than 100 Ω-cm², and more preferably no more than 50 Ω-cm², and even more preferably no more 25 Ω-cm², or no more than 10 Ω-cm².

In various methods the step of selecting the sulfur containing glass composition involves adjusting the mole percent of Si (silicon) to within a value of 1-20 mol % to achieve a glass stability factor >50° C., or >60° C., or >70° C., or >80° C. or >90° C. or >100° C. while still retaining an interface resistance with a Li metal layer that is no more than 200 Ω-cm², and preferably no more than 100 Ω-cm², and more preferably no more than 50 Ω-cm², and even more preferably no more 25 Ω-cm², or no more than 10 Ω-cm².

In various methods the step of selecting the sulfur containing glass composition involves adjusting the mole percent of P (phosphorous) in the glass within a value of 1-20 mol % to achieve an interface resistance with a Li metal layer that is no more than 200 Ω-cm², and preferably no more than 100 Ω-cm², and more preferably no more than 50 Ω-cm², and even more preferably no more 25 Ω-cm², or no more than 10 Ω-cm².

In various methods, the step of selecting the glass composition includes replacing a certain amount of sulfur in the glass with oxygen, or a certain amount of boron in the glass with silicon, the amount sufficient to increase the glass stability factor by at least 10° C. or the Hruby parameter by at least 0.1, while maintaining a Li ion conductivity >$10^{-5}$S/cm, and preferably >$10^{-4}$ S/cm, and more preferably >$10^{-3}$S/cm. In various embodiments the glass stability factor is increased by at least 20° C., 30° C., 40° C., 50° C., 60° C., or 70° C. by the oxygen replacement for sulfur, while maintaining the requisite Li ion conductivity of ≥$10^{-5}$S/cm. In various embodiments the Hruby parameter is increased by at least 0.2, 0.3, 0.4, 0.5, 0.6, or 0.7 by the oxygen replacement for sulfur or the silicon replacement for boron, while maintaining the requisite Li ion conductivity.

In various methods, the step of selecting the glass composition includes decreasing the amount of Li by an amount sufficient to increase the glass stability factor by at least 10° C. or the Hruby parameter by at least 0.1, while maintaining a Li ion conductivity ≥$10^{-5}$S/cm, and preferably ≥$10^{-4}$ S/cm, and more preferably ≥$10^{-3}$S/cm. In various embodiments the glass stability factor is increased by at least 20° C., 30° C., 40° C., 50° C., 60° C., or 70° C. by the decrease in Li content, while maintaining at least the requisite Li ion conductivity of ≥$10^{-5}$S/cm. In various embodiments the Hruby parameter is increased by at least 0.2, 0.3, 0.4, 0.5, 0.6, or 0.7 by the decrease in Li content, while maintaining the aforesaid Li ion conductivity values.

In various methods, the step of selecting the glass composition includes: i) selecting a sulfide base glass system composed of at least one glass former and glass modifier; ii) determining a high conductivity composition within the selected glass system (e.g., the highest Li ion conductivity, or within 50% of that value); and iii) adjusting the high conductivity composition to increase the glass stability factor and/or Hruby parameter by at least 10° C. and/or 10% relative to that of the high conductivity composition, or enhancing the glass stability factor and/or Hruby parameter by at least 20° C. or 20%, or at least 30° C. or 30%, or at least 40° C. or 40%, or at least 50° C. or 50%; and further wherein the Li ion conductivity of the selected composition is lower than that of the high conductivity composition by as much as 2 fold, 5 fold, 10 fold or even 100 fold lower (e.g., between a 2 fold to 10 fold reduction in conductivity, or between a 10 fold to 100 fold reduction).

In various methods, the step of selecting the glass composition includes: i) selecting a sulfide based glass system composed of at least one glass former and glass modifier; ii) determining a high conductivity composition within the selected system which has the highest Li ion conductivity (or within 50% of that value); and iii) adjusting the high conductivity composition to increase the glass viscosity at the liquidus temperature by at least 10% relative to the high conductivity composition (and preferably by at least 20%, or at least 30%, or at least 40%, or at least 50%); and further wherein the Li ion conductivity of the selected composition is lower than that of the high conductivity composition by as much as 2 fold, 5 fold, 10 fold or even 100 fold (e.g., between 2 fold to 10 fold reduction or between a 10 fold to 100 fold reduction in Li ion conductivity).

Continuing with reference to FIGS. 5A-C, once the Li ion conducting sulfur containing glass composition is selected 505, the raw precursor materials (e.g., Li$_2$S, SiS$_2$, and P$_2$S$_5$ powders) 510 are processed. With reference to methods 500A-B, as illustrated in FIGS. 5A-B, the processing steps involve forming a vitreous preform 530A from the raw precursor materials, or melting the raw precursor materials 530B for making the vitreous solid electrolyte sheet by melt drawing. In method 500C the process involves the extra step of making a glass batch 520C from the raw precursor materials, and then processing the glass preform or drawing a sheet from the twice-melted glass. In various embodiments, the batch glass formed in step 520C may be processed by melt/quenching the raw material precursors or by mechanical milling. The re-melting or formation of a vitreous preform from a batch glass, regardless of how it (the batch glass) is formed, allows better control of processing variables, including minimizing loss of volatile constituents.

In various embodiments vitreous solid electrolyte sheet 100 is sufficiently flexible and long to be configured as a continuous web of Li ion conducting glass, typically wound on a spool, and thus suitable as a source roll for downstream (R$_2$R) or roll-to-sheet processing of electrode subassemblies, electrode assemblies and battery cells. Preferably the continuous web has bending radius ≤100 cm, and preferably ≤50 cm, more preferably ≤30 cm, even more preferably ≤10 cm, and yet even more preferably ≤5 cm, or ≤2.5 cm, or ≤1 cm, and thus can be wound as such without fracture.

In various embodiments the spool or drum has a diameter >100 cm and ≤200 cm; or >50 cm and ≤100 cm; or >25 cm and ≤50 cm; or >10 cm and ≤25; or >5 cm and ≤10 cm; or >1 cm and ≤5 cm; or >0.5 cm and ≤1 cm. In various embodiments the freestanding and flexible vitreous sulfur-based glass strip is ultimately wound about a spindle for incorporation into a battery cell, the spindle having a diameter of about 1 cm or less (e.g., a spindle of diameter 5 mm, 4 mm, 3 mm, 2 mm, 1 mm, and 0.5 mm).

The instant web of vitreous solid electrolyte glass sheet is typically of sufficient length for cutting to size solid electrolyte ribbons for at least two individual solid electrolyte separator components or electrode assembly components. Typically, the length of the web is sufficient for making many multiples of such said components (e.g., at least 5, at least 10, or at least 20 of such said components). For example, at least 5, 10 or at least 20 discrete solid electrolyte ribbons. For instance, in various embodiments the length of the solid electrolyte web of vitreous Li ion conducting sulfide glass is more than 20 cm, 50 cm, 100 cm, 500 cm or more than 1000 cm long.

Preferably, the vitreous web of solid electrolyte glass is flexible, and formed as a continuous roll on a spool for storage, transportation and component manufacture, such as, in various embodiments, roll to roll ($R_2R$) manufacturing of downstream battery cell components, including electrode subassemblies, electrode assemblies, and battery cells thereof. Preferably, the solid electrolyte web has sufficiently high surface quality and thickness uniformity that it requires no post solidification grinding and/or polishing. In making a solid electrolyte separator component from the web, discrete solid electrolyte glass sheets of predetermined length and width are cut to size (e.g., preferably a laser cutting).

In various embodiments, the continuous web of vitreous Li ion conducting glass serves as a downstream substrate onto which a lithium electroactive material layer (e.g., lithium metal) or a tie-layer and/or a current collecting layer (e.g., Cu or Ni metal) is deposited or placed with adherence (i.e., adhered to the vitreous glass web). When making individual lithium electrode assemblies from a continuous web, in various embodiments the lithium metal layer may be deposited or adhered onto the web in an intermittent fashion, and typically in periodic sections, thus creating lithium coated sections separated by uncoated regions (e.g., by using masking techniques). In other embodiments, individual glass sheets may be cut to size from the vitreous web prior to depositing the lithium metal layer or tie-layer and/or current collecting layer.

Figure 6:
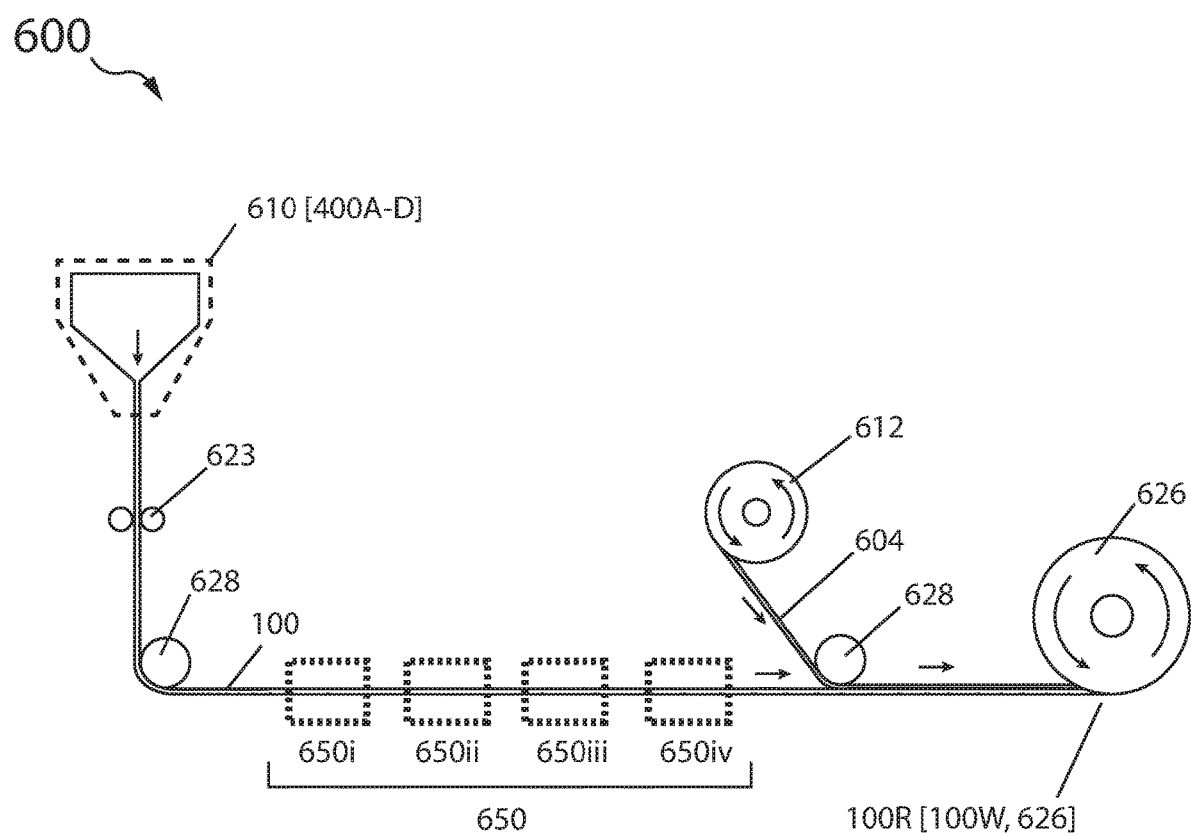
FIG. 6 illustrates a fabrication system and method for making a continuous web of a freestanding Li ion conducting solid electrolyte sheet in accordance with this disclosure in the form of a continuous roll; the web configured using an inline sheet to roll process.

In various embodiments roll processing of the web is inline with the solid electrolyte vitreous glass sheet drawing process. With reference to FIG. 6, there is illustrated a sheet to roll fabrication system 600 for processing a vitreous web of solid electrolyte glass 100W in the form of a continuous roll. Sheet to roll fabrication system 600 includes solid electrolyte sheet drawing apparatus 610 (e.g., melt draw or preform draw apparatus 400 or 400D respectively, such as a fusion draw apparatus, a slot draw apparatus, or a redraw/preform draw apparatus) configured inline with roll processing apparatus that includes one or more drive mechanisms 623 (e.g., a pair of opposing counter rotating rollers), guide rollers 628, and take-up spool 626 for winding the inorganic vitreous solid electrolyte glass sheet into continuous roll 100R. Preferably, the counter rollers, which are generally motor-driven, are positioned to contact a peripheral edge region of the as-drawn solid electrolyte sheet, and in this way the major area portion of the solid electrolyte sheet (e.g., the high quality center portion) is maintained in a pristine surface state condition (i.e., untouched). Driven by the rotating rollers, solid electrolyte ribbon (long sheet) 100W is typically conveyed along one or more guide rollers (e.g., roller 628) before engaging with take-up roll 626. The web of solid electrolyte glass 100W may be conveyed in an unsupported fashion, or the apparatus may include a support mechanism for supporting the moving vitreous glass ribbon as it is conveyed toward the take-up roll, and/or into one or more processing stages 650 (650$i$, 650$ii$, 650$iii$, 650$iv$).

Typically, solid electrolyte web 100W is caused to traverse through a furnace or hot zone stage 650$i$ for annealing the glass sheet prior to engaging with the take-up roll for winding. The processing stages may include a slitting stage 650$ii$ with a cutting device (e.g., a wire saw) configured to remove edge portions from the high quality center portion of the as-drawn glass. Other stages are contemplated, including a stage for configuring a protector element along the lengthwise edges of the solid electrolyte sheet 650$iii$ and/or material layer coating stages 650$iv$ for coating the surface of solid electrolyte glass web 100W with a tie-layer coating and/or a current collector coating and/or a lithium metal layer, as described in more detail herein below with respect to making a web of electrode sub-assemblies and/or a web of lithium electrode assemblies.

Optionally, to keep the solid electrolyte sheet surfaces from directly contacting each other, interleave 604 (a protective web material layer) may be wound together with the inorganic web of solid electrolyte glass via interleave supply roll/take off-roll 612. The interleaf interposed between layers of the glass sheet roll. Care should be taken in the proper selection of the interleaf, and in particular embodiments the major opposing surfaces of interleave material layer 604 are composed of vitreous carbon (e.g., the interleave may be an organic polymer layer (e.g., a polyolefin or polyester layer) or thin inorganic glass having a vitreous carbon surface coating). Also contemplated is the use of edge protector elements, which, as described above, protect the edges of the solid electrolyte sheet against physical damage, and may also serve as a spacer between sheet layers when the web is wound on a spool, and in this way, the high quality center portion of the solid electrolyte sheet is kept in a pristine surface state (i.e., untouched by a foreign solid surface).

Electrode Sub-Assembly

Figure 7A:
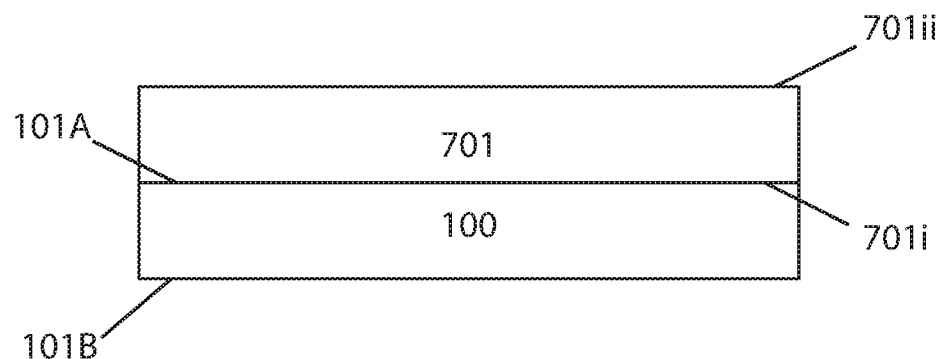
FIGS. 7A-B illustrate electrode subassemblies in accordance with various embodiments of this disclosure.
Figure 7B:
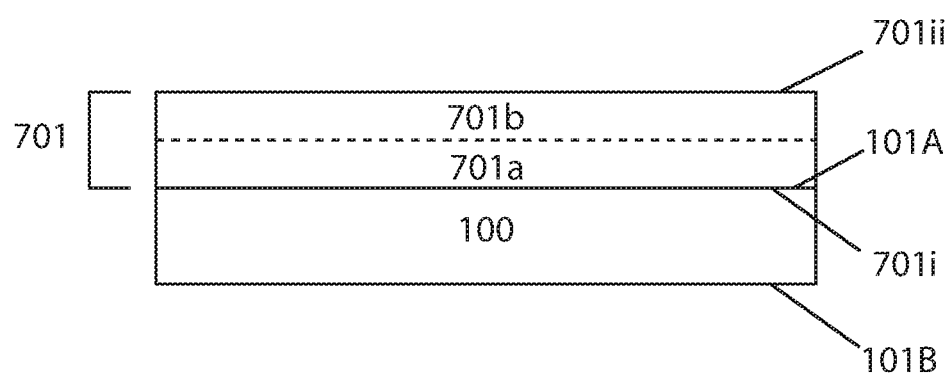

With reference to FIGS. 7A-B, there is illustrated electrode subassembly 700A-B, which, in accordance with the present disclosure, generally serves as a standalone component for making a lithium metal electrode assembly, and in some embodiments may be incorporated directly into a battery cell, also of the present disclosure. As illustrated, subassembly 700A-B is a freestanding substrate laminate composed of a solid electrolyte sheet 100 covered in direct contact by material layer 1101, which provides a surface for creating an electrochemically efficient interface with a lithium metal layer during the making of a standalone lithium metal electrode assembly or during the course of charging in a battery cell.

Material layer 701 may be characterized as having interior surface 701$i$ adjacent to and in direct contact with surface 101A of solid electrolyte sheet 100, and exposed surface 701$ii$ opposing the exterior environment about the subassembly. Typically, material layer 701 is significantly thinner than solid electrolyte sheet 100 on which it is coated, formed on or adhered to. In various embodiments material layer 701 or a layer portion thereof is a transient layer that effectively disappears (e.g., by alloying) once a lithium metal layer is applied or deposited onto it.

As mentioned above, electrode subassembly 700A-B is a standalone component useful for making a lithium metal electrode assembly or battery cell of the present disclosure. However, the electrode subassembly by itself is not a capacity-bearing electrode, and thus does not contain electroactive material (e.g., Li metal) for providing ampere-hour capacity to a battery cell. Accordingly, electrode subassembly 700A-B has exceptional component shelf life and handle-ability for manufacturing.

With reference to FIG. 7A, in various embodiments electrode subassembly 700A is a bi-layer laminate of material layer 701 (a single layer, typically of uniform composition) coated, adhered or placed onto solid electrolyte sheet 100. With reference to FIG. 7B, in various embodiments, subassembly 700B is composed of more than two layers; for instance, material layer 701 may itself be a multilayer of two or more material layers disposed on surface 101A of sheet 100 (e.g., 701a a tie-layer in direct contact with solid electrolyte sheet 100, and second layer 710b a current collector layer in direct contact with the tie-layer).

In various embodiments material layer 701 is a chemically functional tie-layer coating for creating an electrochemically efficient interface between sheet 100 and a lithium metal layer, and may also provide some protection against damage during storage and handling. Accordingly, the tie layer is of suitable composition and thickness to enhance bonding. In particular embodiments the tie-layer reactively alloys with Li metal on contact to form an electrochemically operable interface. The tie-layer is preferably a transient layer, which transforms and essentially disappears upon the formation or deposition of lithium metal on its surface. In various embodiments the tie-layer is thin enough and/or the lithium layer is of sufficient mass (i.e., thickness) to completely dissolve the tie layer (e.g., via an alloying reaction), and preferably the elements of the tie-layer are in such small amount and fully dispersed throughout the lithium metal layer to be insignificant.

In various embodiments protective tie-layer 701 is a coating of a metal or semi-metal suitable for forming an electrochemically operable interface between a lithium metal layer and solid electrolyte sheet 100, and, in particular, an electrochemically efficient interface for plating and stripping lithium metal in a battery cell. In various embodiments, the tie-layer is a metal or semi-metal such as Al, Ag, In, Au, $S_n$, Si, or the like, or an alloy or inter-metallic combination of metals or semi-metals capable of alloying or being alloyed by lithium metal on contact.

In various embodiments the tie-layer 701 is a metal or semi-metal coating deposited by physical vapor deposition (e.g., by evaporation) onto first principal side surface 101A of sheet 100. Tie-layer 701 is a transient film that on contact with Li metal atomically disperses throughout the lithium metal layer. In various embodiments tie-layer 701 is of a composition and thickness to fully alloy with lithium metal on contact at room temperature, and in some embodiments heat may be applied to facilitate alloying and atomic diffusion. In various embodiments the tie-layer thickness is in the range of 0.05 to 5 μm and more typically between 0.05 to 1 μm (e.g., about 0.05 μm, or 0.1 μm, 0.2 μm, 0.3 μm, 0.4 μm, 0.5 μm, 0.6 μm, 0.7 μm, 0.8 μm, 0.9 μm, or about 1.0 μm, or 2.0 μm, 3.0 μm, 4.0 μm or about 5.0 μm).

The tie-layer provides a subassembly surface for mating the solid electrolyte sheet to a lithium metal layer (e.g., extruded lithium film), when forming a lithium electrode assembly or battery cell of the present disclosure. In particular, by reactively alloying with Li metal, the tie layer facilitates formation of an electrochemically operable interface. Moreover, the tie-layer is a transient material layer in that once the lithium metal layer is applied or formed, the tie-layer effectively disappears as it alloys with Li.

With reference to FIG. 7A, in various embodiments the lithium metal layer is applied onto exterior tie-layer surface 701ii during fabrication of a lithium electrode assembly (e.g., a Li foil hot rolled onto the tie-layer). In other embodiments the lithium metal layer is formed by electrochemically plating Li metal adjacent to interior tie-layer surface 701i during initial charging of a battery cell in which the electrode subassembly is incorporated. Whether formed electrochemically in a battery cell or applied or coated to form a lithium metal electrode assembly, lithium metal interacts with the tie-layer to form an intimate electrochemically operable interface between the as-formed or applied lithium metal layer and first principal side surface 101A of solid electrolyte sheet 100.

With reference to subassembly 700B in FIG. 7B, in various embodiments material layer 701 is a multilayer (e.g., a bi-layer) devoid of Li metal. In various embodiments bi-layer 701 is composed of tie-layer 701a in direct contact with first principal side surface 101A of sheet 100, and current collecting layer 701b in direct contact with the tie-layer. The tie-layer sandwiched between sheet 100 and current collecting layer 701b. In various embodiments the tie-layer may be evaporated onto the solid electrolyte sheet 100 followed by applying a current collecting layer 701b directly onto the tie-layer 701a. In other embodiments it is contemplated that the tie-layer may be evaporated onto the current collector layer, and the multi-layer, so formed, applied onto the sheet. Multiple tie-layer coatings are also contemplated herein, such as one or more additional tie-layer coatings disposed between tie-layer 701a and current collecting layer 701b. For instance, an additional tie-layer may be utilized to enhance and improve the Li metal interface in direct contact with current collecting layer 701b.

In alternative embodiments it is contemplated that the current collecting layer may be applied directly onto sheet surface 101A, in the absence of a tie-layer.

The current collector layer may be a thin metal foil, or a thin metal film on a polymer substrate, or a coating applied directly onto sheet surface 101A, or indirectly via a tie-layer. For example a thin Cu or Ni foil, or a laminate of a Cu film on a polyethylene terephthalate (PET) substrate. The current collector should be a material layer that is substantially unreactive in contact with Li metal and of sufficient electronic conductivity to provide effective current collection, typically a metal (e.g., Cu or Ni).

In various embodiments, the current collecting layer is preferably significantly thinner than solid electrolyte sheet 100 (e.g., ≤⅕ or ≤ 1/10 the thickness of sheet 100), and preferably no thicker than 10 μm. In various embodiments the current collecting material layer is <20 μm thick, and typically <15 μm, and more preferably ≤10 um, and even more preferably ≤5 μm thick (e.g., between 10 to 5 μm thick; for example about 5 μm, or 4 μm, or 3 μm, or 2 μm, or 1 μm thick).

In various embodiments, electrode subassembly 700A serves as a substrate component for making a standalone lithium metal electrode assembly of the present disclosure. In other embodiments electrode subassembly 700A may be directly incorporated into a lithium battery cell as a lithium free negative electrode, completely devoid of Li metal, as described in more detail below.

Electrode Assembly

Figure 8A:
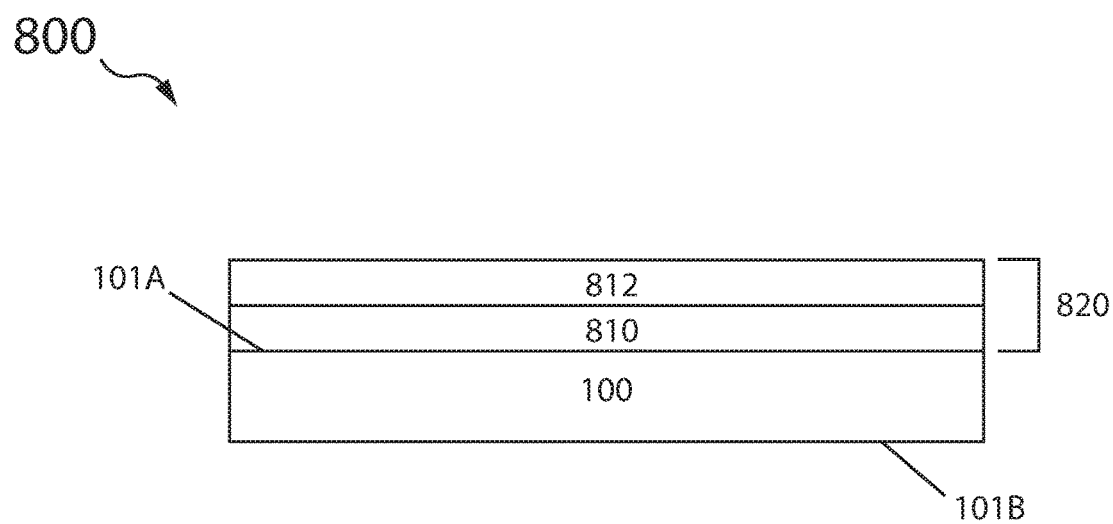
FIG. 8A illustrates a cross sectional depiction of a lithium metal electrode assembly in accordance with this disclosure.

With reference to FIG. 8A, standalone electrode assembly 800A is a lithium metal electrode assembly composed of solid electrolyte sheet 100 serving as a substrate for lithium metal component layer 820, which is composed of lithium metal layer 810 and optional current collecting layer 812. By use of the term standalone with respect to the lithium metal electrode assembly it is meant that the electrode assembly is a discrete component absent of a positive electrode and that it exists as a freestanding component outside of a battery cell.

In various embodiments, standalone lithium metal electrode assembly 800 contains sufficient amount of Li metal to support the rated capacity of the cell in which it is disposed, and in particular matches or exceeds the rated area ampere-hour capacity of the positive electrode. For example, the positive electrode having an area capacity of 1 mAh/cm² and the Li metal layer thickness is at least 5 μm; or 1.5 mAh/cm² and the Li metal layer thickness is at least 7.5 μm; or 2 mAh/cm² and the Li metal layer thickness is at least 10 μm; or 2.5 mAh/cm² and the Li metal layer thickness is at least 12.5 μm; or 3 mAh/cm² and the Li metal layer thickness is at least 15 μm; or 3.5 mAh/cm² and the Li metal layer thickness is at least 17.5 μm; or 4 mAh/cm² and the Li metal layer thickness is at least 20 μm; or 4.5 mAh/cm² and the Li metal layer thickness is at least 22.5 μm; or 5 mAh/cm² and the Li metal layer thickness is at least 25 μm.

In other embodiments, the amount of lithium metal in standalone electrode assembly 800, prior to incorporation into a battery cell, is insufficient to support the rated capacity of the cell. For instance, the rated capacity of the cell is about 50% greater than the Li metal capacity of the standalone electrode assembly, or about 100% greater, or about 150% greater, or about 200% greater, or about 250% greater, or about 300% greater, or about 350% greater, or about 400% greater, or about 450% greater, or about 500% greater. For example, the positive electrode having an area capacity of 1 mAh/cm² and the Li metal layer thickness is <5 μm; or the positive electrode having an area capacity of 2 mAh/cm² or about 3 mAh/cm² or about 4 mAh/cm² or about 5 mAh/cm² and the Li metal layer thickness is <10 μm (e.g., about 5 μm).

In some embodiments electrode assembly 800 is fabricated by depositing lithium metal layer 810 (e.g., by evaporation or sputter deposition) directly onto sheet surface 101A or indirectly via a tie-layer (e.g., the lithium deposited onto exterior surface 701ii of subassembly 700A, as illustrated in FIG. 7A). When evaporated, lithium metal layer 810 typically has thickness in the range of 5 to 30 μm (e.g., about 5 μm, about 10 μm, about 15 μm, about 20 μm, about 25 μm, or about 30 μm.

In other embodiments, the Li metal layer may be an extruded Li foil, or Li film on a current collecting substrate, with the thickness of the lithium metal layer being about 5 μm, 10 μm, 15 μm, 20 μm, 25 μm, 30 μm, 35 μm, 40 μm, 45 μm, or 50 μm thick). Electrode assembly 800 formed by adhering the Li foil or Li film directly onto surface 101A of solid electrolyte sheet 100 (e.g., by laminating with heat) or by laminating the Li foil/film to a subassembly of a tie-layer coated sheet, as described above. To enhance bonding and improve the interface, the Li foil/film is treated or processed to expose fresh Li surfaces just prior to lamination. For example, in various embodiments the Li foil is freshly extruded and then immediately laminated to sheet 100, or the Li foil/film may be treated to expose fresh surfaces (e.g., by bristle scrubbing the surface). The freshly extruded or treated foil is then immediately mated to sheet 100 (e.g., directly onto sulfide glass surface 101A or a tie layer if a subassembly is employed). Exposure of the fresh Li surfaces to the ambient environment should be minimized to the maximum possible extent, and the ambient environment should have a very low moisture and oxygen content of preferably less than 10 ppm.

By use of the term "fresh" when referring to an extruded Li foil or a freshly scrubbed lithium metal surface it is meant that the ambient exposure time between extruding/scrubbing and laminating is limited to avoid forming a prohibitively thick resistive film on the lithium surface. To be considered fresh, ambient exposure should be limited to minutes, typically <10 minutes, and preferably <1 minute and more preferably <30 seconds. In embodiments, ambient exposure is between 1-3 minutes, or less than 60 seconds, or less than 30 seconds, or less than 20 seconds, or less than 10 seconds (e.g., within about 10 or 5 seconds).

Figure 8B:
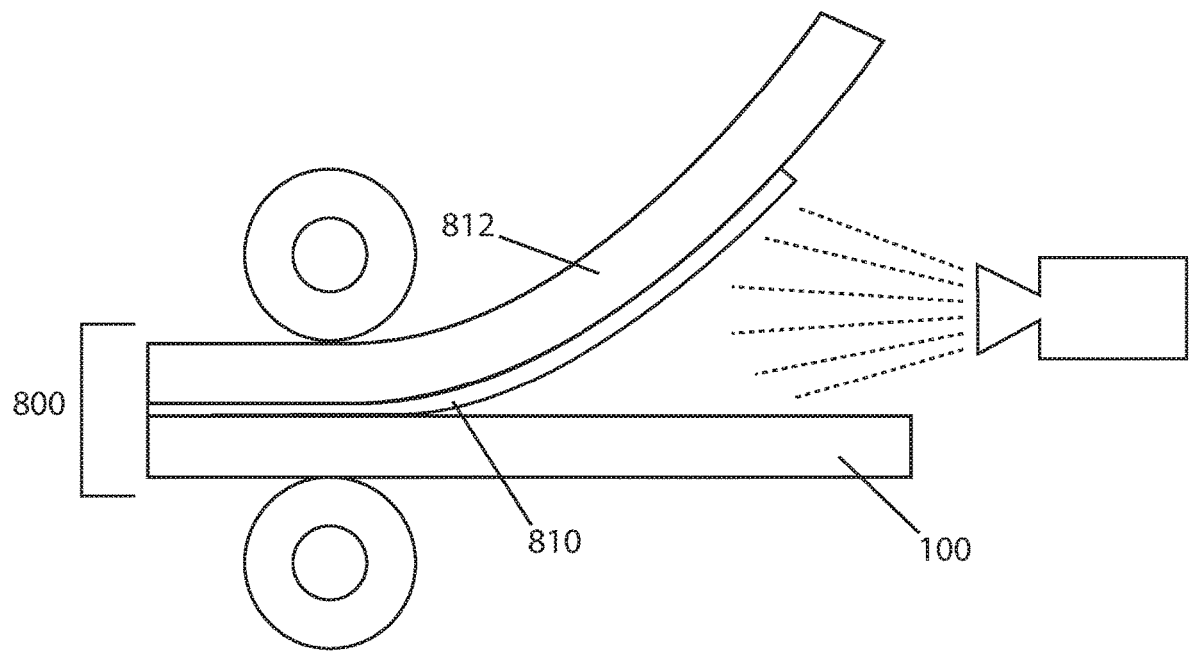
FIG. 8B illustrates a method of making a lithium metal electrode assembly in accordance with various embodiments of this disclosure.

With reference to FIG. 8B, in other embodiments standalone lithium metal electrode assembly 800 may be formed by laminating current collecting layer 812 directly onto solid electrolyte sheet 100 by evaporating Li metal or by spraying molten lithium as a bonding layer between it (812) and sheet 100, followed by optional roller pressing. Notably, prior to the laminating step, current collector 812 (e.g., Cu foil) is devoid of Li metal, and thus the technique provides a method for bonding sheet 100 to a discrete self-supporting Cu foil in the absence of a pre-existing lithium metal layer. Moreover, the thickness of the Li metal bonding layer can be adjusted. In various embodiments it is advantageous to have an exceptionally thin bonding layer, of thickness sufficient to effect bonding but otherwise scant as it pertains to the amount of capacity it provides to a battery cell. For example, a scant Li metal bonding layer may have thickness of no more than about 5 μm (e.g., about 1-2 μm), and is highly advantageous when combining the electrode assembly with a Li ion positive electrode in a battery cell, wherein almost all of the Li cell capacity is derived from the fully lithiated intercalation compound of the positive electrode (e.g., LCO, NCA, NMC). In operation, the thin Li metal bonding layer serves as a seed layer for enhancing uniformity of Li metal deposition onto current collector 812 during initial charging of the battery cell, without burdening the cell with an overcapacity of Li metal because it (the bonding layer) is scant relative to the area capacity of the positive electrode.

In an alternative embodiment, not shown, it is contemplated that current collector layer 812 may have a pre-existing lithium metal layer already present on its surface prior to laminating to the solid electrolyte in the presence of a lithium metal vapor.

Figure 8C:
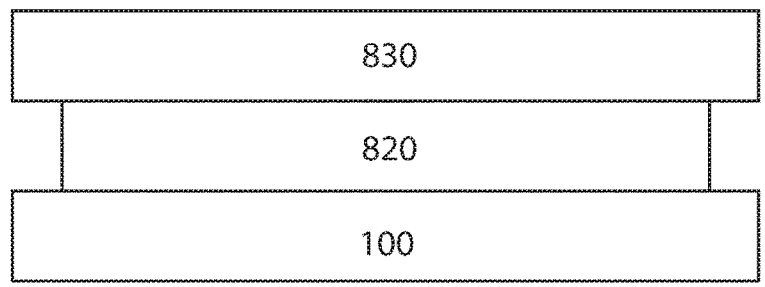

With reference to FIG. 8C there is illustrated what is termed herein an encapsulated standalone lithium metal electrode assembly 800C. In various embodiments encapsulated assembly 800C is composed of lithium metal component layer 820 encapsulated between a first solid electrolyte sheet 100 and an opposing backplane component 830 impermeable to liquids it comes into contact with, and preferably non-reactive. Lithium metal component layer 820 comprises a lithium metal layer in direct contact with sheet 100, and one or more optional layers, as described in more detail below, which are adjacent to backplane 830. Solid electrolyte sheet 100 and backplane component 830 respectively define the major exterior opposing surfaces of the lithium metal electrode assembly. By use of the term encapsulate when referring to the lithium metal component layer of the assembly it is meant that the solid electrolyte sheet and backplane component are in contiguous mechanical force contact with the lithium metal component layer. Accordingly, as a result of the encapsulation, lithium metal component layer 820, and in particular the lithium metal layer, may be subjected to stacking pressure when incorporated in a battery cell.

In some embodiments the encapsulated lithium metal electrode assembly is double-sided and the backplane component is a second solid electrolyte sheet (e.g., substantially identical to the first solid electrolyte sheet). In other embodiments, backplane component is not a Li ion conductor, and the encapsulated lithium metal electrode assembly is referred to herein as single-sided; for instance, the backplane may be a substantially inert material layer or an electronically conductive material layer with current collector functionality. By use of the term single-sided or double-sided it is meant with respect to whether one or both sides of the electrode assembly supports Li ion through transport (via electrical migration).

Figure 8D:
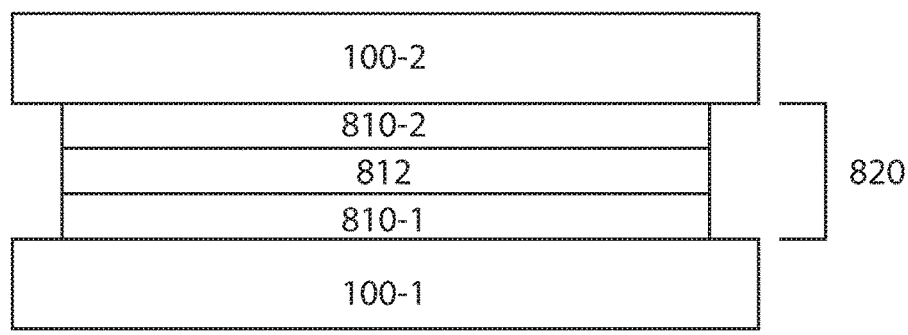

With reference to FIG. 8D, in some embodiments encapsulated electrode assembly 800D is double-sided, and the backplane component is a second solid electrolyte sheet (designated as 100-2). When double-sided, lithium metal component layer 820 is typically a tri-layer composed of current collecting layer 812 disposed between first and second lithium metal layers, 810-1 and 810-2 respectively.

In various embodiments, the encapsulated double-sided lithium metal electrode assembly is fabricated by providing a first and a second lithium metal electrode assembly as described above with reference to FIG. 8A, and combining the two assemblies between a single current collecting layer 812, or when the two assemblies are provided each with their own current collecting layer, they may be combined by placing one on the other (i.e., current collector to current collector).

Figure 8E:
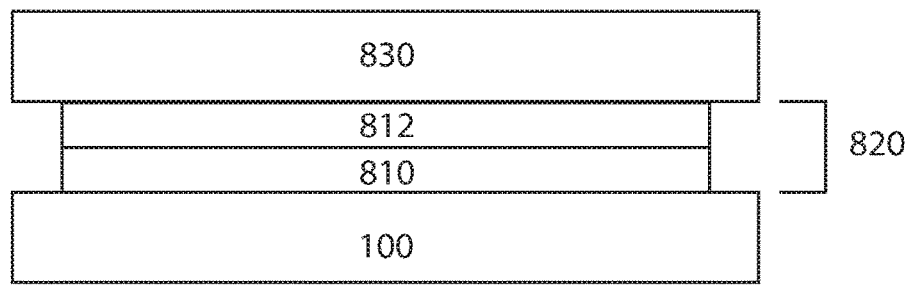

With reference to FIG. 8E, in other embodiments, the backplane component is not a Li ion conductor, and assembly 800E, encapsulated, is single-sided. In various embodiments, when single-sided, backplane component 830 may be an inert material component layer, or electronically conductive with current collector functionality. For instance, inert backplane component 830 may be a polymeric layer (rigid or flexible) or when electronically conductive, the backplane may be a multi-layer of at least one polymer layer providing an exterior surface of the assembly and an electronically conductive metal layer in electronic communication with the lithium metal layer (e.g., in direct contact with the lithium metal layer or in direct contact with a Cu current collecting layer).

In various embodiments the encapsulated assembly may be edge sealed along the lengthwise and/or widthwise dimensions. When entirely sealed along its edges, the assembly is fully sealed and preferably hermetic, and the lithium metal layer(s) are isolated from the external environment.

With reference to FIG. 8F, in various embodiments the edge seals (e.g., lengthwise edges as shown) may be effected by fusion or pinch sealing the peripheral edges of solid electrolyte sheet 100-1 to that of solid electrolyte sheet 100-2. The direct bonding between sheets 100-1 and 100-2 may be performed with heat and/or pressure. For instance by heating the periphery of one or both sheets above $T_g$ (e.g., using a laser to heat the edges), and more typically above the softening temperature, and pressing/compressing (i.e., pinching) to effect the seal, or heating above $T_m$ and allowing the sheets to fusion seal to each other.

In other embodiments, as shown in FIG. 8G, the edge seal(s) may include a discrete sidewall component 835 interfacing with solid electrolyte sheet 100-1 and backplane component 830. The discrete sidewall component may be an inert polymer or a glass wire placed along the lengthwise edge and then heat/fusion sealed to sheet 100 and the backplane component 830 (e.g., a second solid electrolyte sheet). When the edge seal is made with a fusion sealable glass, it is generally not a Li ion conductor (e.g., a non-conducting sulfide glass). In other embodiments the discrete sidewall component may be an epoxy seal; e.g., the epoxy applied as a viscous fluid along the lengthwise edge(s), and then cured (e.g., with heat).

Positive Electrode Assembly

Figure 9:
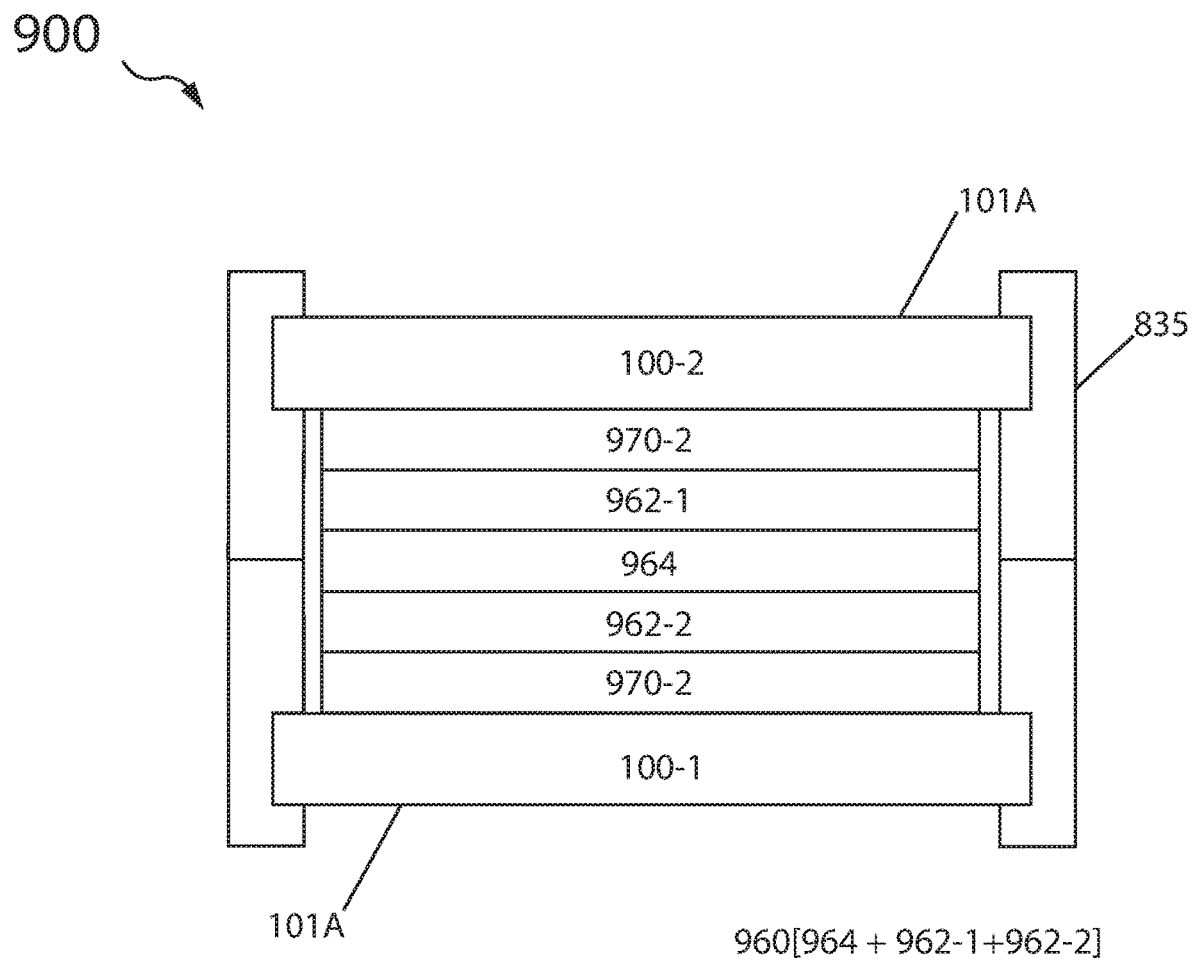
FIG. 9 illustrates a positive electrode assembly in accordance with this disclosure.

With reference to FIG. 9, in various embodiments the electrode assembly is a standalone positive electrode assembly, wherein a positive electroactive component layer is encapsulated between a pair of vitreous solid electrolyte sheets of the present disclosure. Specifically, positive electrode assembly 900 is double-sided and composed of first and second solid electrolyte sheets 100-1 and 100-2 edge sealed via discrete sidewall component 895 (e.g., as described above in various embodiments for the lithium metal electrode assemblies). Positive electroactive material component layer 960 is typically a tri-layer of current collecting layer 964 (e.g., aluminum or stainless foil) coated on both sides by an electroactive material layer 962-1 and 962-2, which, in various embodiments has a lithium ion intercalation compound as its electroactive material (e.g., an oxide such as e.g., $LiCoO_2$, $LiMn_2O_4$, $LiNiO$, $LiNi_{0.33}Mn_{0.33}Co_{0.33}O_2$, $LiNi_{0.8}Co_{0.15}Al_{0.05}O_2$). In various embodiments, positive electrode assembly 900 includes liquid electrolyte in contact with electroactive layer 962, and present in its pores. In various embodiments, as shown, the assembly includes a first and second porous separator layer or gel electrolyte layer (designated as 970-1 and 970-2, respectively), which, impregnated with liquid electrolyte, provide positive separation between the electroactive layers and their opposing solid electrolyte sheets. Preferably the assembly is well sealed around its edges, and the liquid electrolyte is prevented from seeping out (e.g., hermetically sealed). In alternative embodiments the positive electrode assembly may be single-sided and second solid electrolyte sheet 100-2 replaced with a backplane component impermeable to the liquid electrolyte and preferably non-reactive (e.g., a polymer or metal layer). When double-sided, it is contemplated that positive electrode assembly 900 may be edge sealed with a fusion or pinch seal as described above, rather than using a discrete sidewall component. In some embodiments, a solid polymer electrolyte may be used to effect positive separation between the electroactive layers and the opposing solid electrolyte sheets. In this way, the positive electrode assembly may be devoid of a liquid electrolyte.

Battery Cells

Figure 10A:
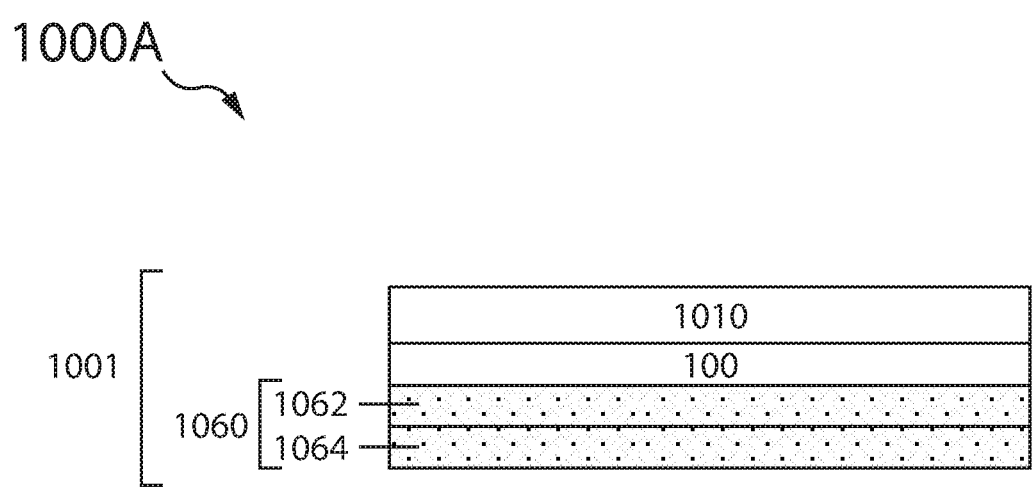

With reference to FIG. 10A there is illustrated a lithium battery cell 1000A in accordance with the present disclosure, the battery cell comprising a cell laminate 1001 including solid electrolyte sheet 100 disposed between positive electrode 1060 and negative lithium electroactive layer 1010, for example a lithium metal layer such as those described above with reference to layer 810 in FIGS. 8A-I.

In various embodiments the combination of lithium electroactive layer 1010 (e.g., an evaporated or extruded lithium metal layer) and solid electrolyte sheet 100 (e.g., a vitreous sulfide glass) is incorporated in the battery cell as standalone solid-state lithium metal electrode assembly 800, as described above with reference to FIGS. 8A-I.

Cell laminate 1001 is generally disposed in a cell housing (not shown). In various embodiments the cell laminate is sufficiently flexible to be foldable and more preferably windable, and thereby cell 1000A may be of a wound prismatic or wound cylindrical construction, or a foldable construct disposed in a rigid or pouch-like housing (e.g., a multilayer laminate material). Battery cell 1000A may be made by: i) combining layers: 1610, 100, and 1060, to form laminate 1001; ii) winding or folding the laminate into a shaped construct (e.g., cylindrical or prismatic); iii) placing the shaped construct into a rigid or flexible housing such as a multilayer laminate pouch or rigid container; and then sealing the pouch or container. When a liquid electrolyte is employed in the cell, it is typically dispensed after the laminate is disposed in the cell housing.

In various embodiments, laminate 1001 is wound or folded with radius of curvature ≤3 cm, or ≤2 cm, or ≤1 cm, or ≤0.5 cm, or ≤0.25 cm, without fracturing solid electrolyte sheet 100. In various embodiments cell 1000A includes a spindle about which laminate 1001 is wound, the spindle typically having diameter ≤6 cm, ≤4 cm, ≤2 cm, ≤1 cm, or ≤0.5 cm.

In various embodiments, positive electrode 1060 includes positive electroactive layer 1062 disposed on current collecting layer 1064 (e.g., a metal foil, such as aluminum, nickel, stainless steel or the like). In various embodiments positive electrode 1060 may be solid-state (i.e., devoid of a liquid electrolyte) or it may contain a liquid electrolyte, typically impregnated in the pores of electroactive layer 1062. In various embodiments positive electroactive layer 1062 is a lithium ion intercalation layer composed of a lithium ion intercalation compound as the electroactive material. When combined with a liquid electrolyte, positive electroactive layer 1662 is typically porous, and when solid-state the layer is preferably dense (e.g., a highly compacted particle composite). Particularly suitable lithium ion intercalation compounds include, for example, intercalating transition metal oxides such as lithium cobalt oxides, lithium manganese oxides, lithium nickel oxides, lithium nickel manganese cobalt oxides, lithium nickel cobalt aluminum oxides (e.g., $LiCoO_2$, $LiMn_2O_4$, $LiNiO$, $LiNi_{0.33}Mn_{0.33}Co_{0.33}O_2$, $LiNi_{0.8}Co_{0.15}Al_{0.05}O_2$ and the like) or intercalating transition metal phosphates and sulfates (e.g., $LiFePO_4$, $Li_3V_2(PO_4)_3$, $LiCoPO_4$, $LiMnPO_4$, and $LiFeSO_4$) or others (e.g., $LiFeSO_4F$ and $LiVPO_4F$), as well as high voltage intercalating materials capable of achieving cell voltages versus lithium metal in excess of 4.5 Volts.

In various embodiments the electroactive material of layer 1062 is of the conversion reaction type including transition metal oxides, transition metal fluorides, transition metal sulfides, transition metal nitrides and combinations thereof (e.g., $MnO_2$, $Mn_2O_3$, $MnO$, $Fe_2O_3$, $Fe_3O_4$, $FeO$, $Co_3O_4$, $CoO$, $NiO$, $CuO$, $Cu_2O$, $MoO_3$, $MoO_2$, and $RuO_2$)).

In various embodiments the electroactive material of layer 1062 is elemental sulfur and/or lithium polysulfide species, typically dissolved in a non-aqueous liquid electrolyte. In such said embodiments, the battery cell may be considered a lithium sulfur battery. Generally, when making use of dissolved electroactive species (polysulfides or otherwise), electroactive layer 1062 is an electron transfer medium that facilitates electrochemical redox during discharge and charge, and, as such, is typically a porous metal or porous carbonaceous layer.

In various embodiments battery cell 1000A is of the hybrid cell type, having a fully solid-state negative electrode (e.g., a fully solid-state lithium metal electrode assembly) and a positive electrode impregnated with a liquid electrolyte, and thus the positive electrode not solid-state. In other embodiments cell 1000A is fully solid-state, and thus entirely devoid of liquid phase electrolyte. In various fully solid state cell embodiments, solid electrolyte sheet 100 serves as the sole solid electrolyte separator layer between negative lithium electroactive layer 1010 (e.g., a lithium metal layer) and positive electrode 1060.

In various embodiments cell 1000A is not fully solid state, and thus includes a liquid phase electrolyte. In some embodiments the liquid phase electrolyte is a common electrolyte present throughout the cell and contacts both the positive electrode (e.g., positive electroactive layer 1062) and negative lithium electroactive layer 1010 (e.g., lithium metal layer). By use of the term "common electrolyte" it is meant that the liquid electrolyte contacts both the negative electroactive layer and the positive electroactive layer, and thus the "common liquid electrolyte" is continuous throughout cell laminate 1001. A common liquid electrolyte yields a rather unusual and counterintuitive cell construction, in that it employs both a solid-state separator composed of solid electrolyte sheet 100 (preferably devoid of through porosity) and a continuous liquid phase electrolyte that contacts both positive electroactive layer 1062 and negative electroactive layer 1010. In fact, solid electrolyte sheet 100 may be used as a Li ion conducting solid electrolyte separator layer in an otherwise conventional lithium ion cell, with the solid electrolyte sheet providing through conduction for Li ions while preventing short circuiting by lithium dendrites and providing protection against thermal runaway. In some embodiments, sheet 100 serves as a direct replacement for the micro-porous polymeric separator layer commonly employed in conventional lithium ion cells (e.g., Celgard® or the like), and in such embodiments battery cell 1000A includes a common liquid electrolyte but is explicitly devoid of a porous separator layer. For example, battery cell 1000A may be embodied by positive electrode 1060 having porous positive electroactive layer 1062 comprising a lithium ion intercalation compound (e.g., $LiCoO_2$) and porous negative electroactive layer 1010 having as its electroactive material a lithium ion intercalation material or alloying material (e.g., intercalatable carbon or silicon or some combination thereof). Moreover, while this disclosure contemplates that the common liquid electrolyte may exist primarily in the pores of the positive and negative electroactive layers, it is not limited as such, and in some embodiments the cell may include one or more porous separator layers (e.g., a micro-porous polymer layer such as a porous polyolefin or the like) or gel electrolyte layer positioned between solid electrolyte sheet 100 and electroactive layer(s) 1010 and/or 1062. When incorporated in a cell having a common liquid electrolyte, solid electrolyte sheet 100 is preferably substantially impervious to the common liquid electrolyte, but the invention is not necessarily so limited.

In various embodiments the battery cell of the present disclosure is of a hybrid cell type: composed of a solid-state and sealed negative electrode assembly, as described above, and a positive electrode impregnated with a liquid electrolyte. When referring to an electrode assembly as solid-state it is meant that the assembly does not contain liquid, and in particular that the electroactive material of the assembly does not contact liquid phase electrolyte.

Figure 10B:
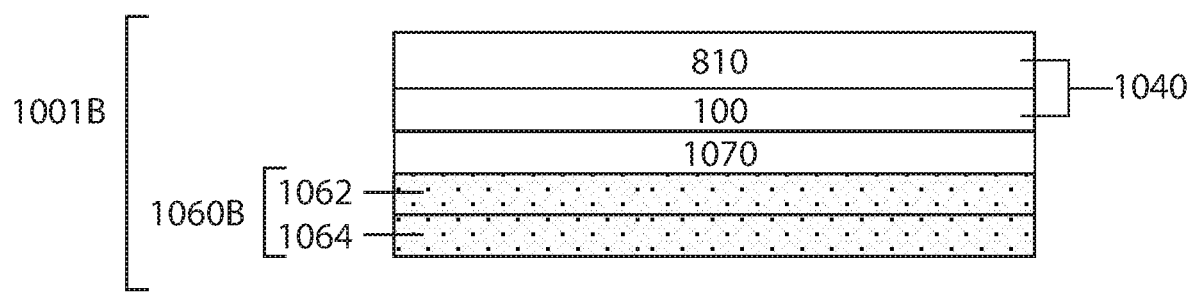

With reference to FIG. 10B, in various embodiments battery cell 1000B is of the hybrid type, and solid-state negative electrode assembly 1040 is an edge sealed lithium metal electrode assembly, such as 800H, illustrated in FIG. 811. In particular embodiments the liquid electrolyte is present in the pores of positive electroactive material layer 1062, and is chemically compatible in direct contact with second side surface 101B of sheet 100. To prevent the liquid electrolyte from contacting lithium metal layer 810, solid electrolyte sheet 100 should be free of through porosity and impermeable to the liquid electrolyte, and therefore substantially impervious.

In various embodiments, and in particular when the solid electrolyte sheet is a sulfide based glass, the liquid phase electrolyte is non-aqueous, and exceptionally dry, meaning that it is has very low moisture content, preferably less than 20 ppm, more preferably less than 10 ppm, and even more preferably less than 5 ppm. Non-aqueous liquid electrolytes suitable for use herein include solutions of organic solvent(s), such as carbonates (e.g., DMC, EEC, PC, EC), and a lithium salt dissolved therein (e.g., $LiBF_4$, $LiClO_4$, $LiPF_6$, LiTf and LiTFSI; where Tf=trifluormethansulfonate; TFSI=bis(trifluoromethanesulfonyl)imide), as well as liquid electrolytes based on ionic liquids, as are known in the battery field arts.

In various embodiments, cell laminate 1001B includes separator layer 1070 disposed between negative electrode 1040 and positive electrode 1060; the separator layer typically a porous material layer or gel electrolyte layer impregnated with the non-aqueous liquid electrolyte. For instance, separator layer 1070 a porous organic polymer, such as a porous polyolefin layer (e.g., microporous). Separator layer 1070 provides positive separation between second principal side surface 101B of solid electrolyte sheet 100 and positive electroactive material layer 1062. The separator layer may provide various benefits. In particular embodiments, layer 1070 enables the combination of a solid electrolyte sheet and a positive electroactive material layer that are chemically incompatible in direct contact with each other. In other hybrid cell embodiments, the composition of solid electrolyte sheet 100 is chemically compatible in direct contact with the positive electroactive material of layer 1062, and laminate 1001B may be absent layer 1070, and sheet 100 and layer 1062 disposed in direct contact. Cell laminate 1001B may be wound or folded and incorporated into a cell housing. Thereafter, the liquid phase electrolyte dispensed into the cell, wherein it contacts positive electrode 1020B but does not contact lithium metal layer 810, as it is isolated inside the sealed electrode assembly.

In particular embodiments cell 1000B is composed of: i) electroactive layer 810—a lithium metal layer; ii) solid electrolyte sheet 100—a substantially impervious vitreous Li ion conducting sulfide based glass sheet; iii) positive electroactive material layer 1062—composed of a lithium intercalation material, such as an oxide (e.g., $LiCoO_2$, $LiMn_2O_4$, LiNiO, $LiNiMnCoO_2$ or the like) or phosphate (e.g., $LiFePO_4$); iv) optional separator layer 1670—a porous polymer or gel, impregnated with a liquid phase electrolyte; v) a non-aqueous liquid phase electrolyte present in the pores of layers 1062 and 1070, and chemically compatible with second principal side surface 101B of sulfide based solid electrolyte glass sheet 100. For instance, lithium metal layer 810 and solid electrolyte sheet 100 incorporated into cell 1000B as an edge sealed solid-state lithium metal electrode assembly.

Figure 10C:
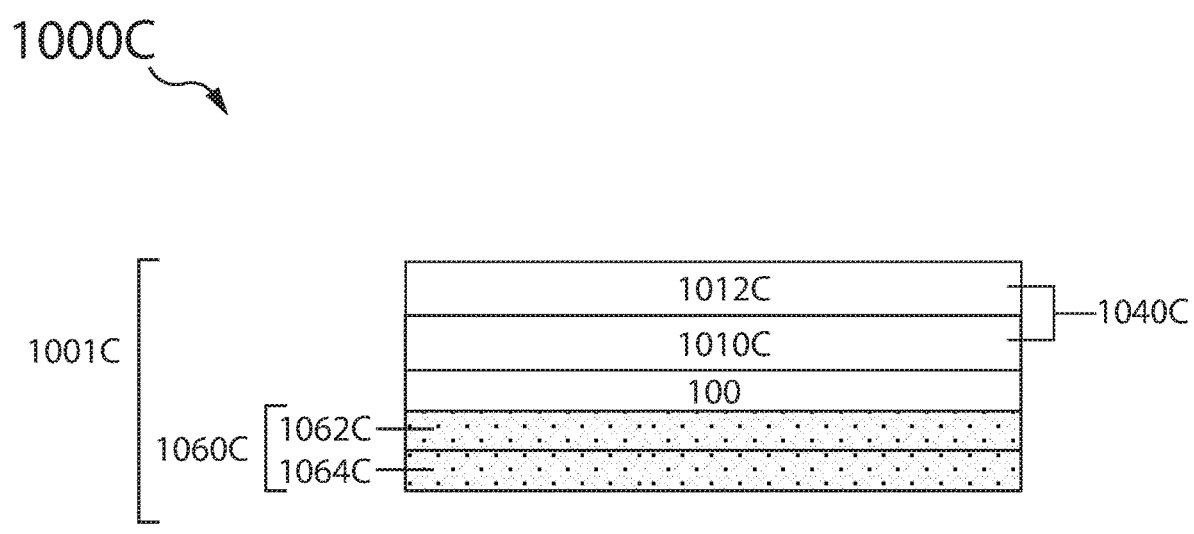

With reference to FIG. 10C there is illustrated a fully solid-state battery cell 1000C in accordance with various embodiments of this disclosure. The cell includes solid-state positive electrode 1060C; solid-state negative electrode 1040C; and Li ion-conducting solid electrolyte sheet 100 serving as separator. In some embodiments, components 1060C/1040C/100 are incorporated into the cell as discrete material layers. In other embodiments, separator sheet 100 and negative/positive electrodes 1040C/1060C are incorporated in the cell as standalone components (e.g., standalone lithium negative electrode assembly or as a standalone lithium positive electrode assembly.

Solid-state positive electrode 1040C includes positive electroactive layer 1062C and current collector layer 1024C. In various embodiments electroactive layer 1062C is a composite of positive electroactive material combined with solid electrolyte material of composition similar to, or the same as, that of vitreous sulfide glass sheet 100. Without limitation, particle composite layer 1062 may be fabricated by compaction or tape casting of positive electroactive particles, Li ion conducting sulfide glass or sulfide glass-ceramic particles, and optionally electronically conductive particles for enhancing electronic conductivity, such as a carbonaceous material, (e.g., carbon black particles). In particular embodiments the positive electroactive particles are Li ion intercalating compounds, as described above (e.g., metal oxides).

Solid-state negative electrode 1040C is composed of electroactive material layer 1010C, which may be a lithium metal layer as described above, with optional current collecting layer 1012C. In various embodiments, lithium metal layer 1010C and solid electrolyte sheet 100 are incorporated into cell 1000C as a standalone lithium metal electrode assembly in accordance with various embodiments of the present disclosure. In alternative embodiments, negative electroactive layer 1010C is not a lithium metal layer, but rather a layer comprising lithium electroactive material having a potential near that of lithium metal, such as, but not limited to, intercalatable carbon, silicon or a combination thereof. In such said embodiments, electroactive layer 1010C may be a particle compact or tape cast layer of negative electroactive material particles (e.g., intercalatable carbon) combined with solid electrolyte particles of composition similar to, or the same as, that which constitutes sheet 100. Negative electroactive layer 1010C may further contain electronically conductive diluents (such as high surface area carbons) as well as binder materials for enhancing mechanical integrity of the layer.

In various embodiments fully solid-state battery cell 1000C is composed of positive and negative electrodes that are each composite powder compacts or tape cast layers, separated by a solid electrolyte sheet of the present disclosure (e.g., a vitreous sheet of a Li ion conducting sulfide based glass).

With reference to FIG. 10D there is illustrated a process for making a lithium metal battery cell 1000D that, in its as-fabricated state, is devoid of lithium metal. The cell is composed of cell laminate 1001D comprising: i) electrode subassembly 700B having current collecting layer 701b and optional tie layer 1101a, as described above with reference to FIG. 7B; and ii) positive electrode 1060 comprising electroactive layer 1062 and current collecting layer 1664. In some embodiments cell 1000D is a hybrid cell with a liquid electrolyte impregnated as described above with reference to FIG. 10B. In other embodiments cell 1000D may be a solid-state battery cell, and therefore absent liquid electrolyte and its associated separator layer 1070. Continuing with reference to FIG. 10D, electroactive layer 1062 is a fully lithiated lithium intercalation material layer, and is the sole source of Li in the as-fabricated cell. Lithium metal 810 is formed as a result of the initial cell charge, as Li from layer 1062 is plated onto electrode subassembly 700B, and in particular onto current collecting layer 701b, thereby producing lithium metal component layer 1020.

Figure 10E:
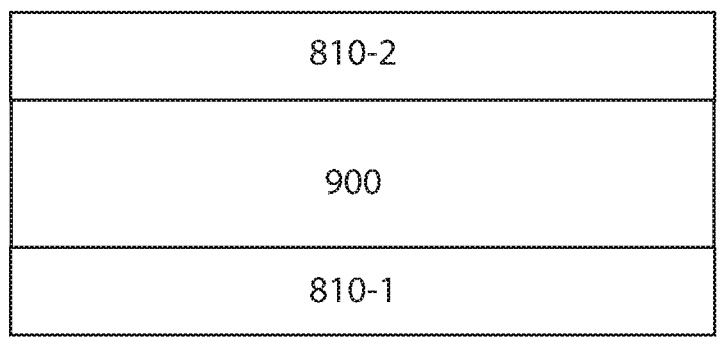

Finally, with reference to FIG. 10E there is illustrated a lithium metal battery cell in accordance with the present disclosure; the cell is composed of positive electrode assembly 900 (shown in detail in FIG. 9) and lithium metal layer 810-1 and 810-2 disposed in direct contact with first surface 101A of respective solid electrolyte sheets 100-1 and 100-2.

It is understood that the examples and embodiments described herein are for illustrative purposes only and that various modifications or changes in light thereof will be suggested to persons skilled in the art. Although various details have been omitted for clarity's sake, various design alternatives may be implemented. Therefore, the present examples are to be considered as illustrative and not restrictive, and the disclosure is not to be limited to the details given herein, but may be modified within the scope of the appended claims.

What is claimed is:

1. A lithium ion-conductive solid electrolyte, comprising:
   a freestanding inorganic vitreous sheet of sulfide-based lithium ion conducting glass having,
   a liquid-like surface;
   an area of at least 10 cm$^2$;
   a thickness of no more than 100 µm; and
   a room temperature intrinsic lithium ion conductivity of at least 10$^{-5}$ S/cm.

2. The electrolyte of claim 1, wherein the glass sheet has a substantially uniform thickness of no more than 100 µm.

3. The electrolyte of claim 1, wherein the glass sheet further comprises substantially parallel lengthwise edges.

4. The electrolyte of claim 1, wherein the glass sheet is a continuous web at least 100 cm in length.

5. The electrolyte of claim 1, wherein the glass sheet is a continuous web at least 1000 cm in length.

6. The electrolyte of claim 1, wherein the vitreous sulfide-based glass sheet is characterized as having a threshold current for Li dendrite initiation that is greater than 1 mA/cm$^2$.

7. The electrolyte of claim 1, wherein the liquid-like surface lacks surface flaws having a depth dimension greater than 1% of the sheet thickness.

8. The electrolyte of claim 1, wherein the sheet lacks of powder particles, inter-particle boundaries, or contiguous voids extending between first and second principal surfaces that are sufficient to propagate a Li dendrite, and the liquid-like surface lacks flaw manifestations of a pressed powder compact that are sufficient to initiate Li dendrite penetration.

9. The electrolyte of claim 1, wherein the sulfide glass has a glass stability factor $\{T_x-T_g\}<100°$ C.

10. The electrolyte of claim 1, wherein the sulfide glass has a glass stability factor $\{T_x-T_g\}<50°$ C.

11. The electrolyte of claim 1, wherein the sulfide glass has a glass stability factor $\{T_x-T_g\}<30°$ C.

12. The electrolyte of claim 1, wherein the sulfide-based glass is of a type Li$_2$S—YS$_n$; Li$_2$S—YS$_n$—YO$_n$ and combinations thereof, wherein Y is selected from the group consisting of Ge, Si, As, B, or P, and n=2, 3/2 or 5/2.

13. The electrolyte of claim 12, wherein the glass is chemically and electrochemically compatible in contact with lithium metal.

14. The electrolyte of claim 12, wherein the glass is devoid of phosphorous.

15. The electrolyte of claim 1, wherein the glass comprises Li$_2$S and/or Li$_2$O as a glass modifier and one or more of a glass former selected from the group consisting of P$_2$S$_5$, P$_2$O$_5$, SiS$_2$, SiO$_2$, B$_2$S$_3$ and B$_2$O$_3$.

16. The electrolyte of claim 1, wherein the electrolyte is disposed in a battery cell component as a separator adjacent a negative lithium electroactive layer.

17. The electrolyte of claim 1, wherein the electrolyte is disposed in a battery cell as a separator between a positive electrode and a negative lithium electroactive layer.

18. A battery cell comprising:
   a positive electrode;
   a negative electrode; and
   a solid electrolyte in accordance with claim 1 in lithium ion communication with the positive and negative electrode.

* * * * *